(12) United States Patent
Kim et al.

(10) Patent No.: US 12,733,034 B2
(45) Date of Patent: Sep. 8, 2026

(54) CHANNEL ACCESS CONTROL IN RESTRICTED TARGET WAKE TIME OPERATION

(71) Applicant: Ofinno, LLC, Reston, VA (US)

(72) Inventors: Jeongki Kim, Seoul (KR); Leonardo Alisasis Lanante, Reston, VA (US); Esmael Hejazi Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 324 days.

(21) Appl. No.: 18/228,724

(22) Filed: Aug. 1, 2023

(65) Prior Publication Data

US 2024/0049285 A1 Feb. 8, 2024

Related U.S. Application Data

(60) Provisional application No. 63/395,002, filed on Aug. 4, 2022.

(51) Int. Cl.
*H04W 74/0816* (2024.01)
*H04W 74/08* (2024.01)

(52) U.S. Cl.
CPC ... *H04W 74/0816* (2013.01); *H04W 74/0866* (2013.01)

(58) Field of Classification Search
CPC ...................... H04W 74/0816; H04W 74/0866
See application file for complete search history.

(56) References Cited

U.S. PATENT DOCUMENTS

2006/0187952 A1* 8/2006 Kappes ............. H04W 74/0875 370/445
2015/0341961 A1* 11/2015 Kim .................. H04W 72/0446 370/338
2016/0029389 A1* 1/2016 Merlin .................. H04W 28/26 370/329
2023/0087887 A1* 3/2023 Ajami .............. H04W 74/0808 370/329
2024/0040634 A1* 2/2024 Kim ...................... H04W 48/14

OTHER PUBLICATIONS

Chunyu Hu et al.; "Prioritized EDCA Channel Access Over Latency Sensitive Link(s) In MLO"; IEEE 802.11-20/0408r6; Mar. 9, 2020.
Chunyu Hu et al.; "Protected TWT Enhancement for Latency Sensitive Traffic"; IEEE 802.11-20/1046r14; Jul. 29, 2020.
Chunyu Hu et al.; IEEE P802.11 Wireless LANs; "Proposed Spec Text; Restricted TWT"; IEEE 802.11-20/1395r0; Jan. 1, 2021.

(Continued)

*Primary Examiner* — James P Duffy
(74) *Attorney, Agent, or Firm* — Yasser Mourtada; Kavon Nasabzadeh; James Bender

(57) ABSTRACT

An access point (AP) transmits to a first station (STA) a first frame indicating a trigger-enabled (TE) restricted target wake time (r-TWT) service period (SP) of a TE r-TWT setup between the AP and the first STA. The AP receives from a second STA a Request to Send (RTS) frame during the r-TWT SP. The second STA may not be a member of the TE r-TWT. The AP transmits a second frame for deferring channel access by the second STA during the TE r-TWT SP.

20 Claims, 19 Drawing Sheets

(56) References Cited

OTHER PUBLICATIONS

Chunyu Hu et al.; IEEE P802.11 Wireless LANs; "Restricted TWT Spec Text Resolving TBDs: Part I"; IEEE 802.11-21/462; Apr. 23, 2021.
Chunyu Hu et al.; IEEE P802.11 Wireless LANs; "CC34—TBD and CID Resolution for Restricted TWT Quiet Interval Usage"; IEEE 802.11-21/0683r5; May 10, 2021.
Liangxiao Xin et al.; "Channel Access for Latency Sensitive Traffic"; IEEE 802.11-21/0894r6; May 18, 2021.
Rubayet Shafin et al.; "Handling Fairness Issue in Restricted TWT"; IEEE 802.11-21/1020r0; Jun. 25, 2021.
Chunyu Hu et al.; "Traffic Prioritization During the Restricted TWT SPs"; IEEE 802.11-21/1115r0; Jul. 25, 2021.
Kiseon Ryu et al.; "Restricted TWT SP Termination"; IEEE 802.11-21/1358r1; Aug. 31, 2021.
IEEE P802.11-REVme/D0.1 and 11be-D1.01, Jul. 2021 (pp. 1-12 are cited by pp. 131-134 of P802.11be_D1.01; pp. 7-12 are cited by pp. 1486-1491 of P802.11REVme-D0.1; pp. 13-20 cited by pp. 1559-1566 of P802.11REVme-D0.1; pp. 20-32 are cited by pp. 2228-2240 of P802.11REVme-DO.1; pp. 33-54 are cited by pp. 3812-3834 of P802.11REVme-DO.1; pp. 54-56 are cited by pp. 319-320 of P802.11be_D1.01).

* cited by examiner

CHANNEL ACCESS CONTROL IN RESTRICTED TARGET WAKE TIME OPERATION

CROSS-REFERENCE TO RELATED APPLICATIONS

This application claims the benefit of U.S. Provisional Application No. 63/395,002, filed Aug. 4, 2022, which is hereby incorporated by reference in its entirety.

BRIEF DESCRIPTION OF THE DRAWINGS

Examples of several of the various embodiments of the present disclosure are described herein with reference to the drawings.

DETAILED DESCRIPTION

Figure 1:
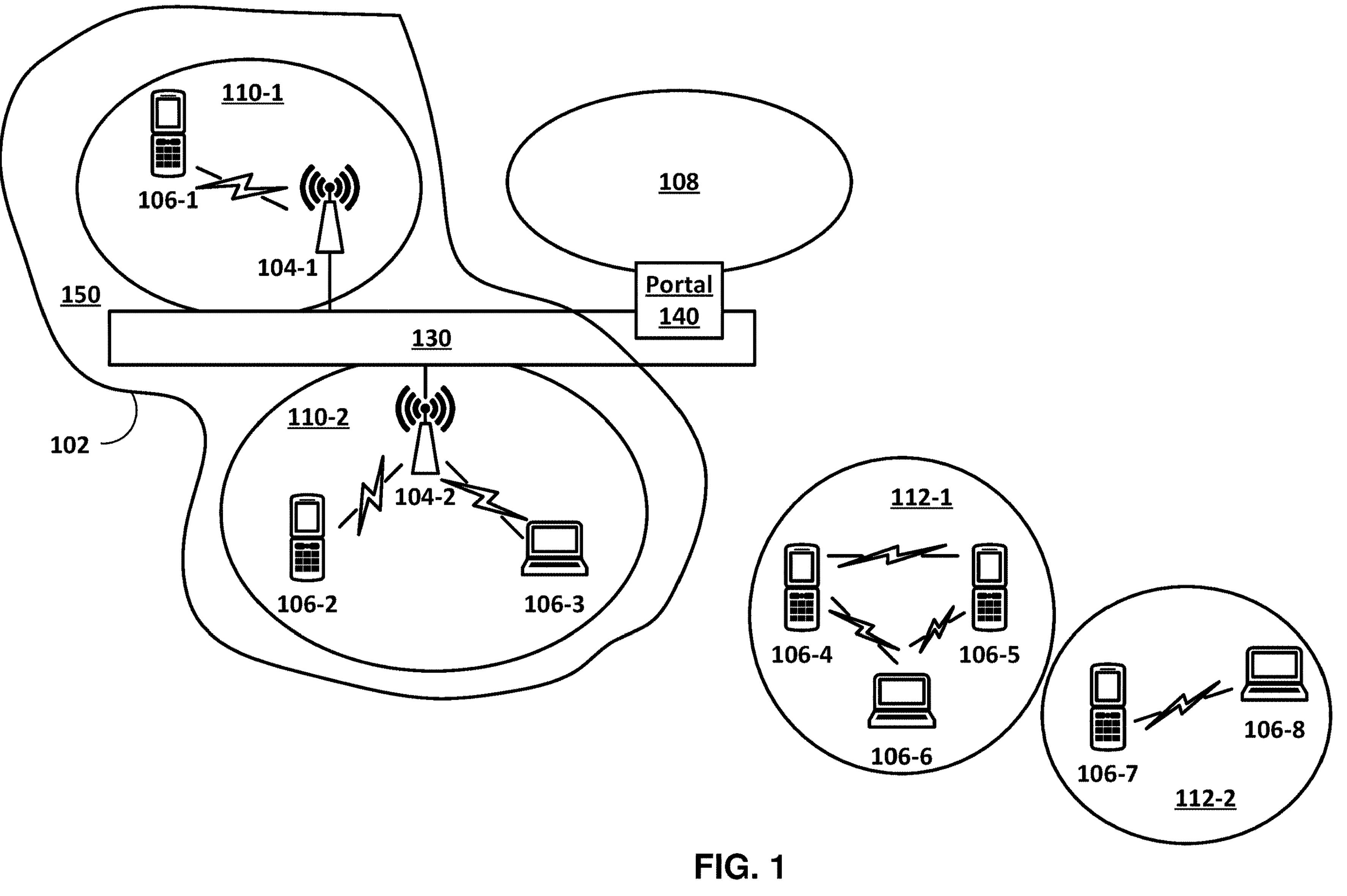
FIG. 1 illustrates example wireless communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. After reading the description, it will be apparent to one skilled in the relevant art how to implement alternative embodiments. The present embodiments may not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a station, an access point, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, may be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={STA1, STA2} are: {STA1}, {STA2}, and {STA1, STA2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages/frames comprise a plurality of parameters, it implies that a parameter in the plurality of parameters is in at least one of the one or more messages/frames but does not have to be in each of the one or more messages/frames.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1 illustrates example wireless communication networks in which embodiments of the present disclosure may be implemented.

As shown in FIG. 1, the example wireless communication networks may include an Institute of Electrical and Electronic Engineers (IEEE) 802.11 (WLAN) infra-structure network 102. WLAN infra-structure network 102 may include one or more basic service sets (BSSs) 110 and 120 and a distribution system (DS) 130.

BSS 110-1 and 110-2 each includes a set of an access point (AP or AP STA) and at least one station (STA or non-AP STA). For example, BSS 110-1 includes an AP 104-1 and a STA 106-1, and BSS 110-2 includes an AP 104-2 and STAs 106-2 and 106-3. The AP and the at least one STA in a BSS perform an association procedure to communicate with each other.

DS 130 may be configured to connect BSS 110-1 and BSS 110-2. As such, DS 130 may enable an extended service set (ESS) 150. Within ESS 150, APs 104-1 and 104-2 are connected via DS 130 and may have the same service set identification (SSID).

WLAN infra-structure network 102 may be coupled to one or more external networks. For example, as shown in FIG. 1, WLAN infra-structure network 102 may be connected to another network 108 (e.g., 802.X) via a portal 140. Portal 140 may function as a bridge connecting DS 130 of WLAN infra-structure network 102 with the other network 108.

The example wireless communication networks illustrated in FIG. 1 may further include one or more ad-hoc networks or independent BSSs (IBSSs). An ad-hoc network or IBSS is a network that includes a plurality of STAs that are within communication range of each other. The plurality of STAs are configured so that they may communicate with each other using direct peer-to-peer communication (i.e., not via an AP).

For example, in FIG. 1, STAs 106-4, 106-5, and 106-6 may be configured to form a first IBSS 112-1. Similarly, STAs 106-7 and 106-8 may be configured to form a second IBSS 112-2. Since an IBSS does not include an AP, it does not include a centralized management entity. Rather, STAs within an IBSS are managed in a distributed manner. STAs forming an IBSS may be fixed or mobile.

A STA as a predetermined functional medium may include a medium access control (MAC) layer that complies with an IEEE 802.11 standard. A physical layer interface for a radio medium may be used among the APs and the non-AP stations (STAs). The STA may also be referred to using various other terms, including mobile terminal, wireless device, wireless transmit/receive unit (WTRU), user equipment (UE), mobile station (MS), mobile subscriber unit, or user. For example, the term "user" may be used to denote a STA participating in uplink Multi-user Multiple Input, Multiple Output (MU MIMO) and/or uplink Orthogonal Frequency Division Multiple Access (OFDMA) transmission.

A physical layer (PHY) protocol data unit (PPDU) may be a composite structure that includes a PHY preamble and a payload in the form of a PHY service data unit (PSDU). For example, the PSDU may include a PHY preamble and header and/or one or more MAC protocol data units (MPDUs). The information provided in the PHY preamble may be used by a receiving device to decode the subsequent data in the PSDU. In instances in which PPDUs are transmitted over a bonded channel (channel formed through channel bonding), the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

A frequency band may include one or more sub-bands or frequency channels. For example, PPDUs conforming to the IEEE 802.11n, 802.11ac, 802.11ax and/or 802.11be standard amendments may be transmitted over the 2.4 GHz, 5 GHz, and/or 6 GHz bands, each of which may be divided into multiple 20 MHz channels. The PPDUs may be transmitted over a physical channel having a minimum bandwidth of 20 MHz. Larger channels may be formed through channel bonding. For example, PPDUs may be transmitted over physical channels having bandwidths of 40 MHz, 80 MHz, 160 MHz, or 320 MHz by bonding together multiple 20 MHz channels.

Figure 2:
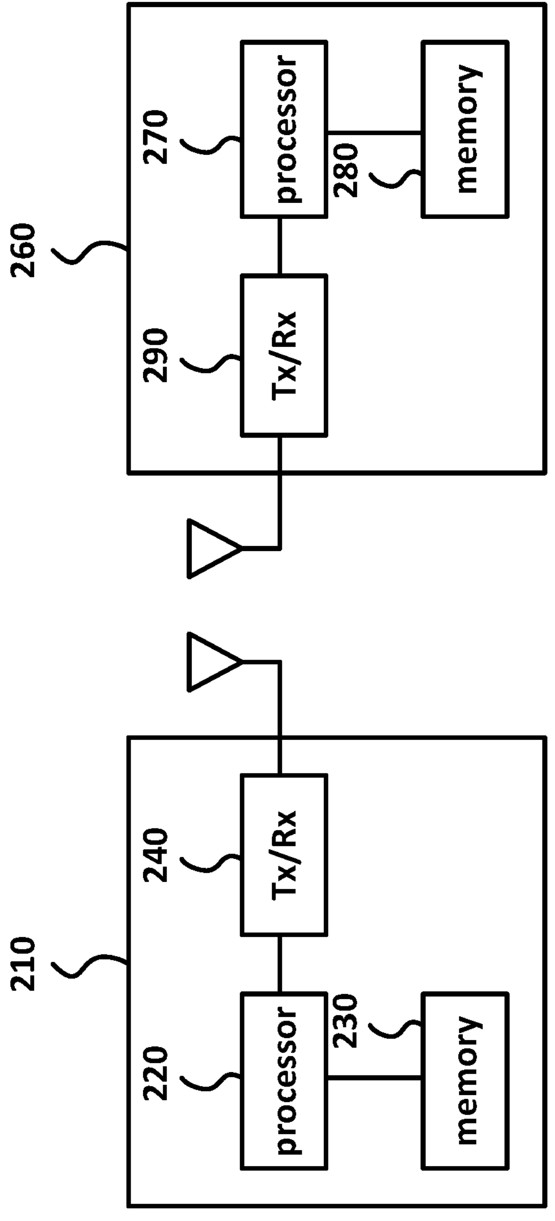
FIG. 2 is a block diagram illustrating example implementations of a station (STA) and an access point (AP).

FIG. 2 is a block diagram illustrating example implementations of a STA 210 and an AP 260. As shown in FIG. 2, STA 210 may include at least one processor 220, a memory 230, and at least one transceiver 240. AP 260 may include at least one processor 270, a memory 280, and at least one transceiver 290. Processor 220/270 may be operatively connected to memory 230/280 and/or to transceiver 240/290.

Processor 220/270 may implement functions of the PHY layer, the MAC layer, and/or the logical link control (LLC) layer of the corresponding device (STA 210 or AP 260). Processor 220/270 may include one or more processors and/or one or more controllers. The one or more processors and/or one or more controllers may comprise, for example, a general-purpose processor, a digital signal processor (DSP), a microcontroller, an application specific integrated circuit (ASIC), a field programmable gate array (FPGA), a logic circuit, or a chipset, for example.

Memory 230/280 may include a read-only memory (ROM), a random-access memory (RAM), a flash memory, a memory card, a storage medium, and/or other storage unit. Memory 230/280 may comprise one or more non-transitory computer readable mediums. Memory 230/280 may store computer program instructions or code that may be executed by processor 220/270 to carry out one or more of the operations/embodiments discussed in the present application. Memory 230/280 may be implemented (or positioned) within processor 220/270 or external to processor 220/270. Memory 230/280 may be operatively connected to processor 220/270 via various means known in the art.

Transceiver 240/290 may be configured to transmit/receive radio signals. In an embodiment, transceiver 240/290 may implement a PHY layer of the corresponding device (STA 210 or AP 260). In an embodiment, STA 210 and/or AP 260 may be a multi-link device (MLD), that is a device capable of operating over multiple links as defined by the IEEE 802.11 standard. As such, STA 210 and/or AP 260 may each implement multiple PHY layers. The multiple PHY layers may be implemented using one or more of transceivers 240/290.

Target wake time (TWT), a feature introduced in the IEEE 802.11ah standard, allows STAs to manage activity in the BSS by scheduling STAs to operate at different times to reduce contention. TWTs may allow STAs to reduce the required amount of time that a STA utilizing a power management mode may be awake. TWTs may be individual TWTs or broadcast TWTs. Individual TWTs follow a negotiated TWT agreement between STAs. Broadcast TWTs are based on a schedule set and provided to STAs by an AP.

In an individual TWT, a STA that requests a TWT agreement is called a TWT requesting STA. The TWT requesting STA may be a non-AP STA for example. The STA that responds to the request is called a TWT responding STA. The TWT responding STA may be an AP for example. The TWT requesting STA is assigned specific times to wake up and exchange frames with the TWT responding STA. The TWT requesting STA may communicate wake scheduling information to the TWT responding STA. The TWT responding STA may transmit TWT values to the TWT requesting STA when a TWT agreement is established between them.

When explicit TWT is employed, the TWT requesting STA may wake up and perform a frame exchange. The TWT requesting STA may receive a next TWT information in a response from the TWT responding STA. When implicit TWT is used, the TWT requesting STA may calculate a next TWT by adding a fixed value to the current TWT value.

The TWT values for implicit TWT may be periodic. The TWT requesting STA operating with an implicit TWT agreement may determine a next TWT service period (TWT SP) start time by adding a value of a TWT wake interval associated with the TWT agreement to the value of the start time of the current TWT SP. The TWT responding STA may include the start time for a series of TWT SPs corresponding to a single TWT flow identifier of an implicit TWT agreement in a target wake time field of a TWT element. The TWT element may contain a value of 'accept TWT' in a TWT setup command field. The start time of the TWT SP series may indicate the start time of a first TWT SP in the series. Start times of subsequent TWT SPs may be determined by adding the value of the TWT wake interval to the start time of the current TWT SP. In an example, the TWT requesting STA, awake for an implicit TWT SP, may enter a doze state after the TWT SP has elapsed or after receiving an end of service period (EOSP) field equal to 1 from the TWT responding STA, whichever occurs first.

A TWT session may be negotiated between an AP and a STA. The TWT session may configure a TWT SP of DL and UL traffic between the AP and the STA. Expected traffic may be limited within the negotiated SP. The TWT SP may start at a specific time. The TWT SP may run for a SP duration. The TWT SP may repeat every SP interval.

Figure 3:
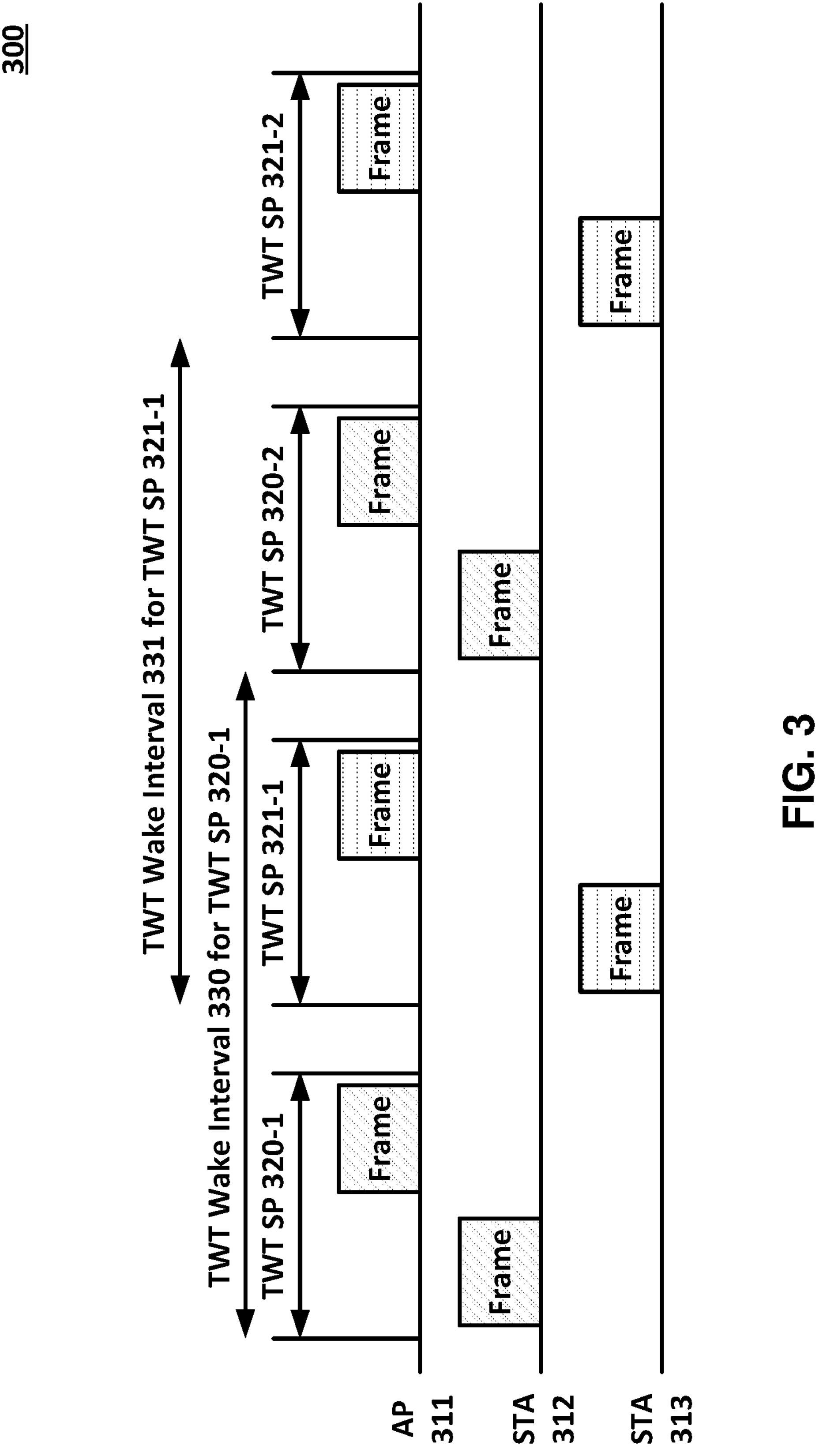
FIG. 3 illustrates an example of target wake time (TWT) operation.

FIG. 3 illustrates an example 300 of TWT operation. As shown in FIG. 3, example 300 includes an AP 311, a STA 312, and a STA 313. AP 311 and STA 312 may establish a TWT SP 320. AP 311 and STA 313 may establish a TWT SP 321. TWT SP 320 and TWT SP 321 may repeat as shown in FIG. 3, such that TWT SP 320 may include a first TWT SP 320-1 and a second TWT SP 320-2, and such that TWT SP 321 may include a first TWT SP 321-1 and a second TWT SP 321-2.

AP 311 and STA 312 may exchange frames during first TWT SP 320-1. STA 312 may enter a doze state at the end of TWT SP 320-1 and may remain in the doze state until the start of second TWT SP 320-2. The start of second TWT SP 320-2 may be indicated by a TWT wake interval 330 associated with TWT SP 320. AP 311 and STA 312 may again exchange frames during second TWT SP 320-2.

Similarly, AP 311 and STA 313 may exchange frames during first TWT SP 321-1. STA 313 may enter a doze state at the end of first TWT SP 321-1 and may remain in the doze state until the start of second TWT SP 321-2. The start of second TWT SP 321-2 may be indicated by a TWT wake interval 331 associated with TWT SP 321. AP 311 and STA 313 may again exchange frames during second TWT SP 31-2.

In an awake state, a STA may be fully powered. The STA may transmit and/or receive a frame to/from an AP or another STA. In a doze state, a STA may not transmit and may not receive a frame to/from an AP or another STA.

An MLD is an entity capable of managing communication over multiple links. The MLD may be a logical entity and may have more than one affiliated station (STA). The MLD may have a single MAC service access point (MAC-SAP) to the LLC layer, which includes a MAC data service. An MLD may be an access point MLD (AP MLD) when a STA affiliated with the MLD is an AP STA (or an AP). An MLD may be a non-access point MLD (non-AP MLD) or STA MLD when a STA affiliated with the MLD is a non-AP STA (or a STA).

During negotiation of TWT agreements, a TWT requesting STA affiliated with a STA MLD and a TWT responding STA affiliated with an AP MLD may communicate multiple TWT elements. The TWT elements may comprise link ID bitmap subfields indicating different link(s) in a TWT setup frame. The TWT parameters provided by a TWT element may be applied to the respective link that is indicated in the TWT element.

Figure 4:
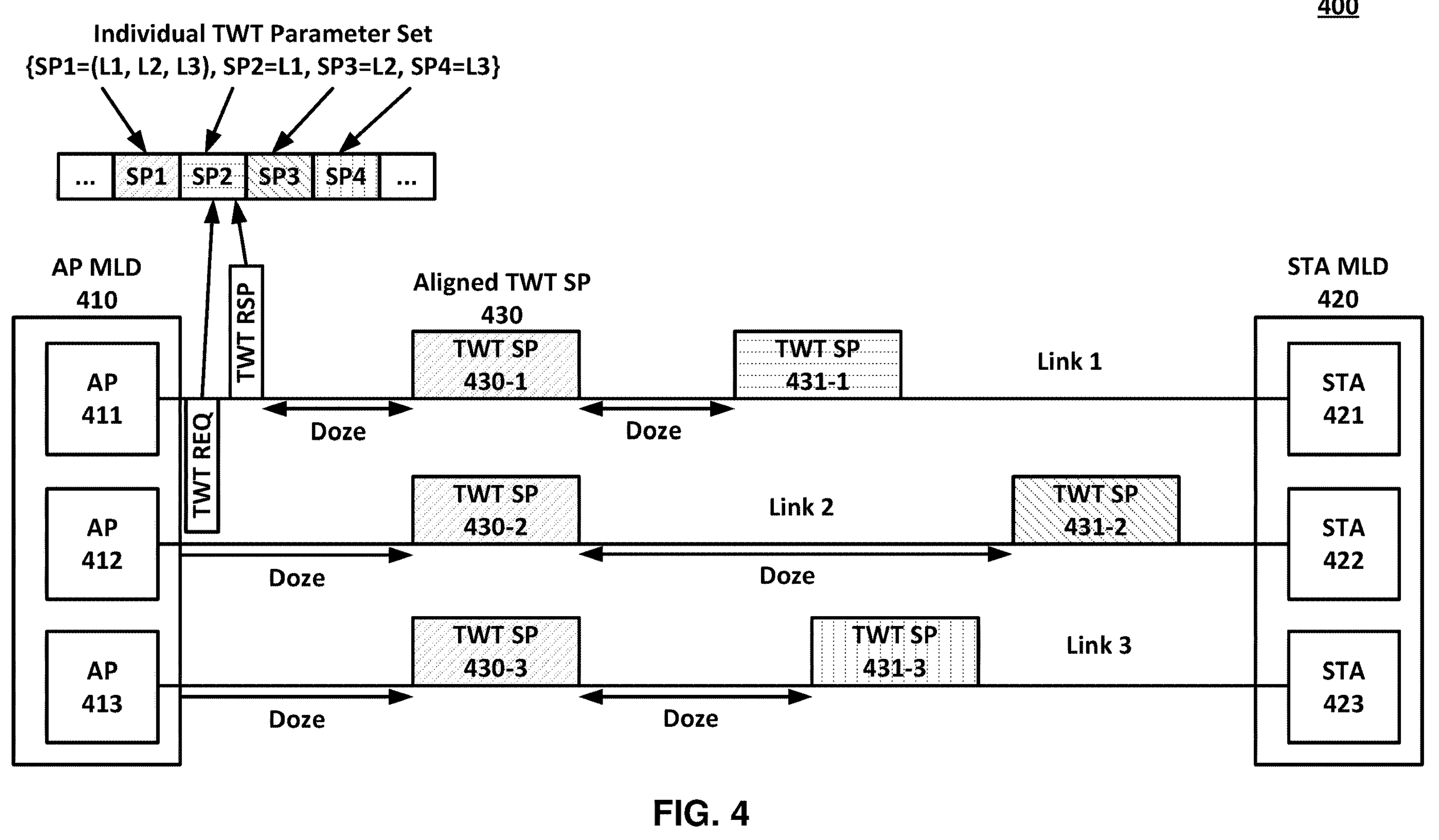
FIG. 4 illustrates an example of TWT operation in an environment including an AP multi-link device (AP MLD) and a station multi-link device (STA MLD).

FIG. 4 illustrates an example 400 of TWT operation in a multi-link environment including an AP multi-link device (AP MLD) 410 and a STA multi-link device (STA MLD) 420. As shown in FIG. 4, AP MLD 410 may have three affiliated APs, AP 411, AP2 412, and AP3 413. In an example, AP 411, AP2 412, and AP3 413 may operate respectively on the 2.4 GHz band, the 5 GHz band, and the 6 GHz band. STA MLD 420 may have three affiliated STAs, STA 421, STA 422, and STA 423. In an example, STA 421, STA 422, and STA 423 may operate respectively on the 2.4 GHz band, the 5 GHz band, and the 6 GHz band. In an example, AP 411, AP2 412, and AP3 413 may be communicatively coupled via a first link (link 1), a second link (link 2), and a third link (link 3) respectively with STA 421, STA 422, and STA 423, respectively.

In an example, STA 421 may transmit a TWT request to AP 411. The TWT request may include three TWT elements. Each TWT element may indicate a respective link of links 1-3 and may request the setup of a TWT agreement for the indicated link. The three TWT elements may have different TWT parameters, such as target wake time (TWT). In response to the TWT request, AP 411 may transmit a TWT response to STA 421. The TWT response may include three TWT elements. Each TWT element may indicate a respective link of links 1-3 and may include a value of 'accept TWT' in a TWT setup command field.

Successful TWT agreement setup on links 1-3 establishes three TWT SPs with same or different TWT parameters on links 1-3 respectively. The target wake time field of the TWT element indicating a given link indicates the start time of the TWP SP for that link. The starting time may be indicated in reference to a time synchronization function (TSF) time of the link.

In example 400, initial TWT SPs 430-1, 430-2, and 430-3 of links 1-3 respectively may be aligned. TWT wake intervals associated with the TWT agreements of links 1-3 respectively may be set differently. As such, second TWT SPs 431-1, 431-2, and 431-3 of links 1-3 respectively may not be aligned. STA 421, STA 422, and STA 423 may enter a doze state between the end of initial TWT SPs 430-1, 430-2, and 430-3, respectively, and the start of second TWT SPs 431-1, 431-2, 431-3, respectively.

Figure 5:
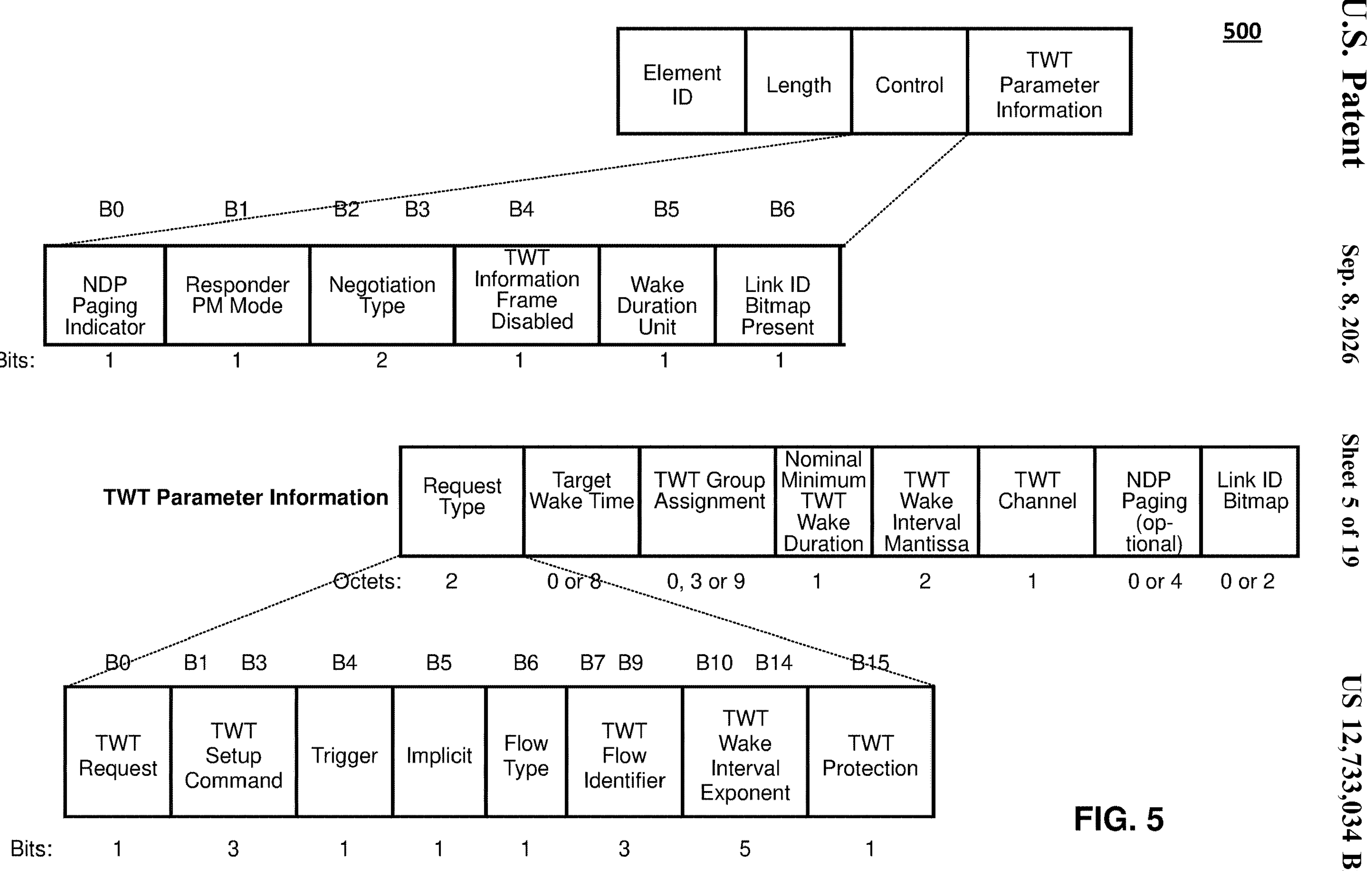
FIG. 5 illustrates an example TWT element which may be used to support individual TWT operation.

FIG. 5 illustrates an example target wake time (TWT) element 500 which may be used to support individual TWT operation.

In an example, an AP and a STA may use TWT element 500 to negotiate a TWT agreement. The AP and/or the STA may transmit TWT element 500 in an individually addressed management frame. The management frame may be of the type action, action no ack, (re)association request/response, and probe request response, for example.

The TWT schedule and parameters may be provided during a TWT setup phase. Renegotiation/changes of TWT schedules may be signaled via individually addressed frames that contain the updated TWT schedule/parameters. The frames may be management frames as described above or control or data frames that carry a field containing the updated TWT schedule/parameters.

Referring to FIG. 5, TWT element 500 includes an element ID field, a length field, a control field, and a TWT parameter information field.

The element ID field (e.g., 1 octet in length) may indicate that information element 500 is a TWT element. The length field (e.g., 1 octet) may indicate the length of TWT element 500 starting from the control field until an end of TWT element 500. The end of TWT element 500 may be the end of a TWT Channel field or the end of a Link ID bitmap field of the TWT parameter information field.

The TWT parameter information field may include a request type field (e.g., 2 octets), a target wake time field (e.g., 8 octets or less), a TWT group assignment field (e.g., 9, 3, 2, or 0 octets), a nominal minimal TWT wake duration field (e.g., 1 octet), a TWT wake interval mantissa (e.g., 2 octets), a TWT channel field (e.g., 1 octet), an optional NDP paging field (e.g., 0 or 4 octets), and/or a Link ID bitmaps field (e.g., 0 or 2 Octets).

The request type field may indicate a type of TWT request. The request type field may include a TWT request field (e.g., 1 bit), a TWT setup command field (e.g., 3 bits), a trigger field (e.g., 1 bit), an implicit field (e.g., 1 bit), a flow type (e.g., 1 bit), a TWT flow identifier (e.g., 3 bits), a TWT wake interval exponent (e.g., 5 bits), and/or a TWT protection field (e.g., 1 bit).

The TWT request field may indicate whether the TWT element 500 represents a request. If TWT request field has a value of 1, then the TWT element 500 may represent a request to initiate TWT scheduling/setup.

The TWT setup command field may indicate a type of TWT command. In a TWT request, the type of TWT command indicated may be: a request TWT (the TWT responding STA specifies the TWT value; e.g., field set to 0), a suggest TWT (the TWT requesting STA suggests a TWT value; e.g., field set to 1), and a demand TWT (the TWT requesting STA demands a TWT value; e.g., field set to 2).

In a TWT response, the type of TWT command indicated may be: TWT grouping (the TWT responding STA suggests TWT group parameters that are different than the suggested or demanded TWT parameters of the TWT requesting STA; e.g., field set to 3), accept TWT (the TWT responding STA accepts the TWT request with the TWT parameters indicated by the TWT requesting STA; e.g. field set to 4), alternate TWT (the TWT responding STA suggests TWT parameters that are different than the parameters suggested or demanded by the TWT requesting STA; e.g., field set to 5), dictate TWT (the TWT responding STA demands TWT parameters that are different than the parameters suggested or demanded by the TWT requesting STA; e.g., field set to 6), or reject TWT (the TWT responding STA rejects the TWT setup; e.g. field set to 7).

In a TWT response, the TWT command may also indicate an unsolicited response or a broadcast TWT. An unsolicited TWT response is an individually addressed frame that is intended for a specific STA. An unsolicited TWT response may be followed by an ACK frame from the STA receiving the unsolicited TWT response. A broadcast TWT may be intended for multiple STAs and may be carried in a broadcast frame such as, for example, a beacon frame. A broadcast TWT may not be acknowledged by receiving STAs.

An unsolicited TWT response may be used a TWT responding STA to demand that a recipient follow a TWT schedule contained in the TWT element. In an embodiment, an unsolicited TWT response may have the TWT request field set to 0 and a value of 'dictate TWT' in the TWT setup command field. A broadcast TWT response may be used by a TWT responding STA to schedule a TWT for any STA that receives and decodes the TWT element.

In certain embodiments, a TWT element, such as TWT element 500, may contain TWT parameter sets for multiple TWT negotiations or indications as described herein. As such, the TWT element may include multiple instances of the Control and the TWT parameter information fields. The TWT flow identifier of the request type field indicates the TWT negotiation which parameters are carried by the TWT parameter information field.

Figure 6:
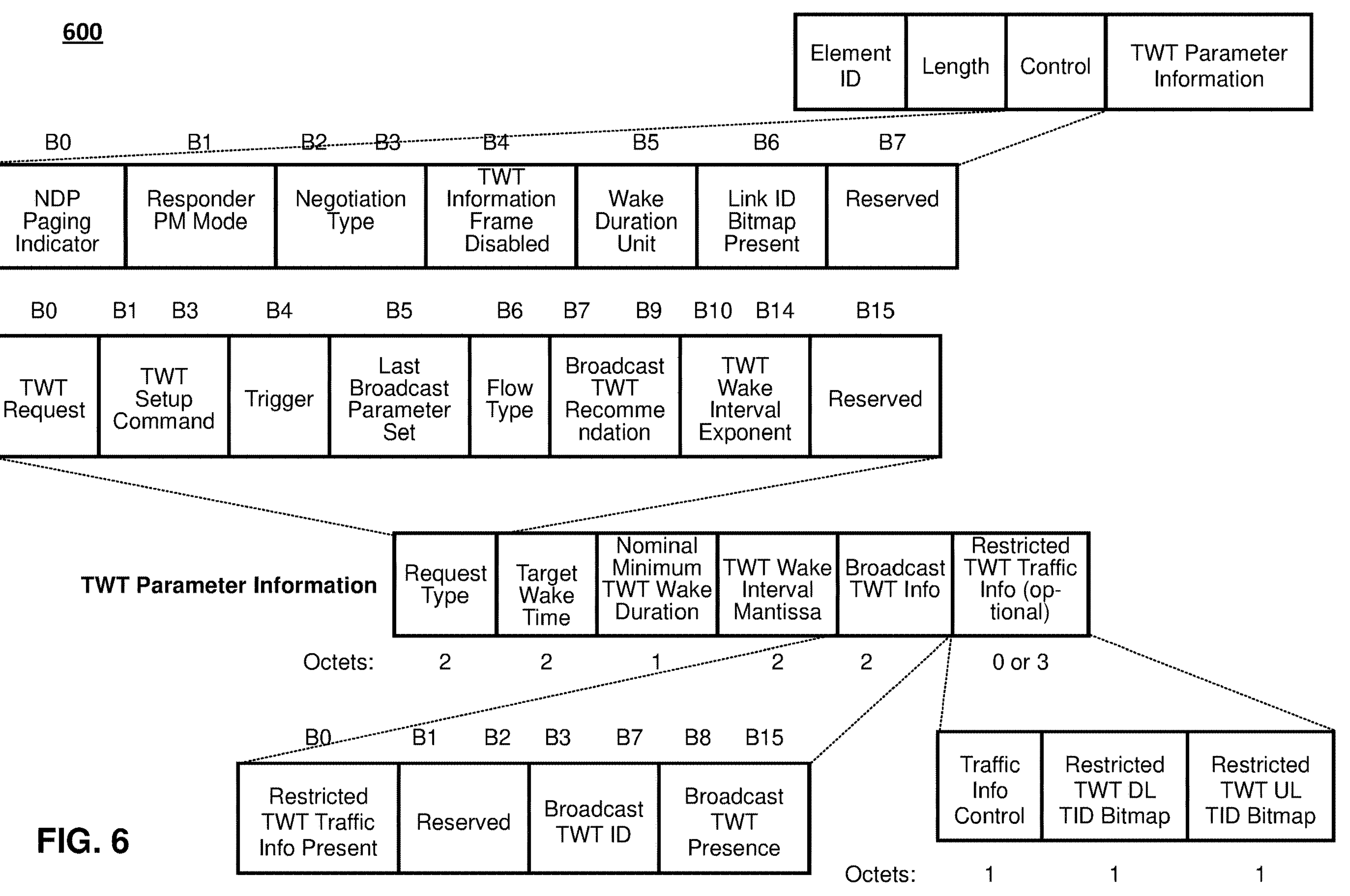
FIG. 6 illustrates an example TWT element which may be used to support restricted TWT (r-TWT) operation.

FIG. 6 illustrates an example target wake time (TWT) element 600 which may be used to support restricted TWT (r-TWT) operation. For r-TWT, TWT element 600 may be transmitted in a broadcast management frame, which can be a beacon frame, a TIM broadcast frame, a probe response frame, etc. In this embodiment, TWT element 600 provides non-negotiated TWT schedules (e.g., broadcast TWT schedules).

As shown, TWT element 600 includes an element ID field, a length field, a control field, and a TWT parameter information field.

The element ID field (e.g., 1 octet in length) may indicate that information element 600 is a TWT element. The length field (e.g., 1 octet) may indicate the length of TWT element 600 starting from the control field until an end of TWT element 600. The end of TWT element 600 may be the end of a broadcast TWT info field or the end of a r-TWT traffic info field of the TWT parameter information field.

The TWT parameter information field may include a request type field, a target wake time field (e.g., 2 octets), a nominal minimal TWT wake duration field (e.g., 1 octet), a TWT wake interval mantissa (e.g., 2 octets), a broadcast TWT info field (e.g., 2 octets), and an optional r-TWT traffic info field (e.g., 0 or 3 octets).

The request type field may include, among other fields, a TWT request field, a flow type field, and a TWT wake interval exponent field.

The TWT request field indicates whether TWT element 600 is a request. If the TWT request field has a value of 0, then TWT element 600 may represent a response to a request to initiate TWT scheduling/setup (solicit TWT), an unsolicited TWT response, and/or a broadcast TWT message.

The TWT wake interval represents the average time that a TWT requesting STA or a TWT scheduled STA expects to elapse between successive TWT SP start times of a TWT schedule. The TWT wake interval exponent field indicates a (base 2) exponent used to calculate the TWT wake interval in microseconds. In an embodiment, the TWT wake interval is equal to: (TWT wake interval mantissa)$\times 2^{(\text{TWT Wake Interval Exponent})}$. The TWT wake interval mantissa value is indicated in microseconds, base 2 in a TWT wake interval mantissa field of the TWT parameter information field.

The nominal minimum TWT wake duration field may indicate the minimum amount of time (in the unit indicated by a wake duration unit subfield of the control field) that a TWT requesting STA or a TWT scheduled STA is expected to be awake to complete frame exchanges for the period of the TWT wake interval.

The flow type field, in a TWT response that successfully set up a TWT agreement between a TWT requesting STA and a TWT responding STA, may indicate a type of interaction between the TWT requesting STA and the TWT responding STA within a TWT SP of the TWT agreement. A flow type field equal to 0 may indicate an announced TWT. In an announced TWT, the TWT responding STA may not transmit a frame to the TWT requesting STA within a TWT SP until the TWT responding STA receives a PS-Poll frame or a QoS Null frame from the TWT requesting STA. A flow type field equal to 1 may indicate an unannounced TWT. In an unannounced TWT, the TWT responding STA may transmit a frame to the TWT requesting STA within a TWT SP before it has received a frame from the TWT requesting STA.

Within a TWT element that includes a TWT setup command value of 'request TWT', 'suggest TWT', or 'demand TWT', a broadcast TWT ID may indicate a specific broadcast TWT in which the TWT requesting STA is requesting to participate. Within a TWT element that includes a TWT setup command value of 'accept TWT', 'alternate TWT', 'dictate TWT', or 'reject TWT', a broadcast TWT ID may indicate a specific broadcast TWT for which the TWT responding STA is providing TWT parameters. The value 0 in the broadcast TWT ID subfield may indicate the broadcast TWT whose membership corresponds to all STAs that are members of the BSS corresponding to the BSSID of the management frame carrying the TWT element and that is permitted to contain trigger frames with random access resource units for unassociated STAs. The Broadcast TWT ID subfield in a r-TWT Parameter set field is always set to a nonzero value.

A broadcast TWT element 600 that contains a r-TWT parameter set is also referred to as a r-TWT element. A r-TWT traffic info present subfield of the broadcast TWT info field may be set to 1 to indicate the presence of the r-TWT traffic info field in TWT element 600. The r-TWT traffic info field is present in a r-TWT parameter set field when the r-TWT traffic info present subfield is set to 1.

The r-TWT traffic info field may include a traffic info control field, a r-TWT DL TID bitmap field, and a r-TWT UL TID bitmap field.

The traffic info control field may include a DL TID bitmap valid subfield and an UL TID bitmap valid subfield. The DL TID bitmap valid subfield indicates if the r-TWT DL TID bitmap field has valid information. When the value of the DL TID bitmap valid subfield is set to 0, it may indicate that DL traffic of TIDs is identified as latency sensitive traffic, and the r-TWT DL TID bitmap field is reserved. The UL TID bitmap valid subfield may indicate if the r-TWT UL TID bitmap field has valid information. When the value of the UL TID bitmap valid subfield is set to 0, it may indicate that UL traffic of TIDs is identified as latency sensitive traffic, and the r-TWT UL TID bitmap field is reserved.

The r-TWT DL TID bitmap subfield and the r-TWT UL TID bitmap subfield may specify which TID(s) are identified by the TWT scheduling AP or the TWT scheduled STA as latency sensitive traffic streams in a downlink and a uplink direction, respectively. A value of 1 at bit position k in the bitmap indicates that TID k is classified as a latency sensitive traffic stream. A value of 0 at bit position k in the bitmap indicates that TID k is not classified as a latency sensitive traffic stream.

An individual target wake time (TWT) may be a specific time or set of times negotiated between two individual stations (e.g., a STA and another STA, or a STA and an AP, etc.) at which the stations may be awake to exchange frames during a service period (SP) of the TWT.

In trigger-enabled TWT, an AP may transmit a trigger frame for scheduling uplink multi-user transmissions from one or more STAs using uplink OFDMA (orthogonal frequency division multiple access) and/or uplink MU-MIMO (multi-user multiple input multiple output) during a trigger-enabled TWT SP. A TWT STA that receives the trigger frame from the AP may transmit a frame to the AP through a resource indicated in the trigger frame during the trigger-enabled TWT SP.

In non-trigger-enabled TWT, an AP may not be required to transmit a trigger frame to schedule uplink multi-user transmissions from one or more STAs during a non-trigger-enabled TWT SP.

In announced TWT, a STA may transmit a frame (e.g., a PS-Poll frame or a QoS null frame) to the AP to retrieve a downlink buffered data from the AP during a TWT SP. In unannounced TWT, an AP may transmit downlink data to a TWT STA without receiving a frame (e.g., a PS-Poll frame, or a QoS null frame) from the TWT STA during a TWT SP.

Figure 7:
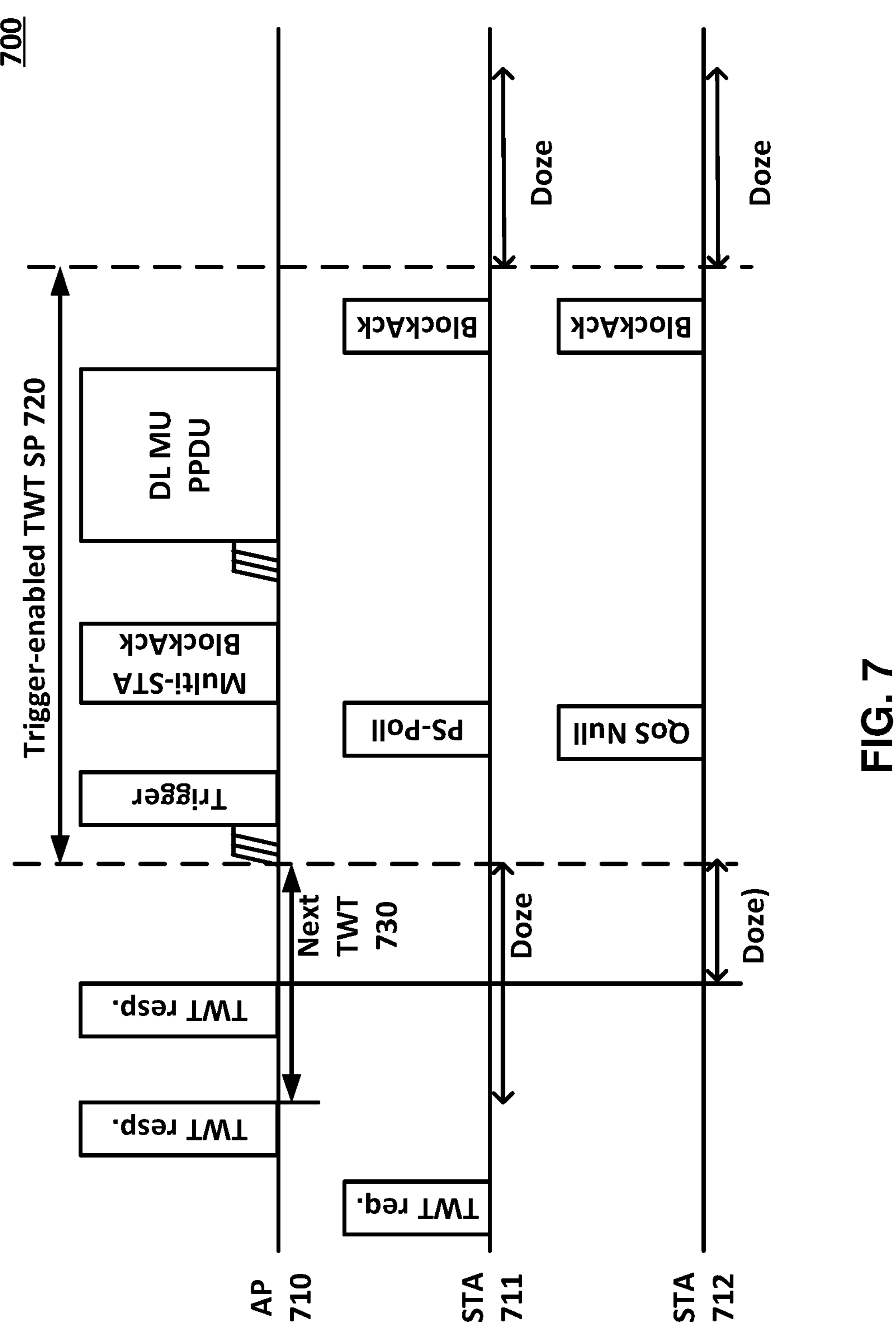
FIG. 7 illustrates an example of individual TWT operation.

FIG. 7 illustrates an example 700 of individual TWT operation. As shown in FIG. 7, example 700 includes an AP 710, a STA 711, and a STA 712. In an example, AP 710 may be a TWT responding STA and STA 711 and STA 712 may be TWT requesting STAs.

In an example, STA 711 may transmit a TWT request to AP 710 to setup a first trigger-enabled TWT agreement. STA 711 may set a trigger field of the TWT request to 1 to indicate that it is requesting a trigger-enabled TWT. AP 710 may accept the first TWT agreement with STA 711. AP 710 may confirm the acceptance in a TWT response sent to STA 711. The TWT response may indicate a next TWT 730, which indicates the time until a next TWT SP 720 according to the first TWT agreement.

In an example, AP 710 may transmit an unsolicited TWT response to STA 712 to set up a second trigger-enabled TWT agreement with STA 712 without receiving a TWT request from STA 712. The first and second TWT agreements may be set up as announced TWTs.

After the setup of the TWT agreements, STA 711 and STA 712 may enter a doze state until the start of TWT SP 720. During trigger-enabled TWT SP 720, AP 710 may transmit a trigger frame. STA 711 and STA 12 may respond to the trigger frame by indicating that they are in awake state. In an example, STA 711 may transmit a power save poll (PS-Poll) frame. The PS-Poll frame may comprise a BSSID (receiver address: RA) field set to an address of AP 710 and a transmitter address (TA) field set to an address of STA 711. In an example, STA 712 may transmit a QoS null frame in response to the trigger frame. The QoS null frame may comprise a MAC header (e.g., a frame control field, a duration field, address fields, a sequence control field, QoS control field) without a frame body.

In response to the PS-Poll frame and the QoS null frame, AP 710 may transmit a multi-STA Block Ack (M-BA) frame. The M-BA frame may include acknowledgement information associated with the PS-Poll frame and the QoS null frame received from STAs 711 and 712 respectively. Subsequently, STA 711 and STA 712 may receive downlink bufferable units (DL BUs) from AP 710. The DL BUs may include a medium access control (MAC) service data unit (MSDU), an aggregate MAC service data unit (A-MSDU), and/or a bufferable MAC management protocol data unit (MMPDU). STA 711 and STA 712 may transmit Block Ack (BA) frames in response to the DL BUs. At the end of the TWT SP 720, STA 711 and STA 712 may return to a doze state.

A STA may execute individual TWT setup exchanges. The STA may not transmit frames to an AP outside of negotiated TWT SPs. The STA may not transmit frames that are not contained within high efficiency trigger-based physical protocol data units (HE TB PPDUs) to the AP within trigger-enabled TWT SPs. A HE TB PPDU may be transmitted by a STA based on receiving a trigger frame triggering uplink multi-user transmissions.

The AP of a trigger-enabled TWT agreement may schedule for transmission a trigger frame for a STA within the trigger-enabled TWT SP. The STA may transmit an HE TB PPDU as a response to the trigger frame sent during the trigger-enabled TWT SP. A STA that is in power save (PS) mode may include a PS-Poll frame or a QoS null frame in the HE TB PPDU if the TWT is an announced TWT, to indicate to the AP that the STA is currently in the awake state. The AP that receives the PS-Poll frame or the QoS Null frame or any other indication from an STA in PS mode, may deliver to the STA as many buffered BUs as are available at the AP during the TWT SP.

A broadcast target wake time (TWT) may be a specific time or set of times broadcast by an AP to one or more STAs at which the STAs may be awake to exchange frames with the AP during a SP of the TWT.

Figure 8:
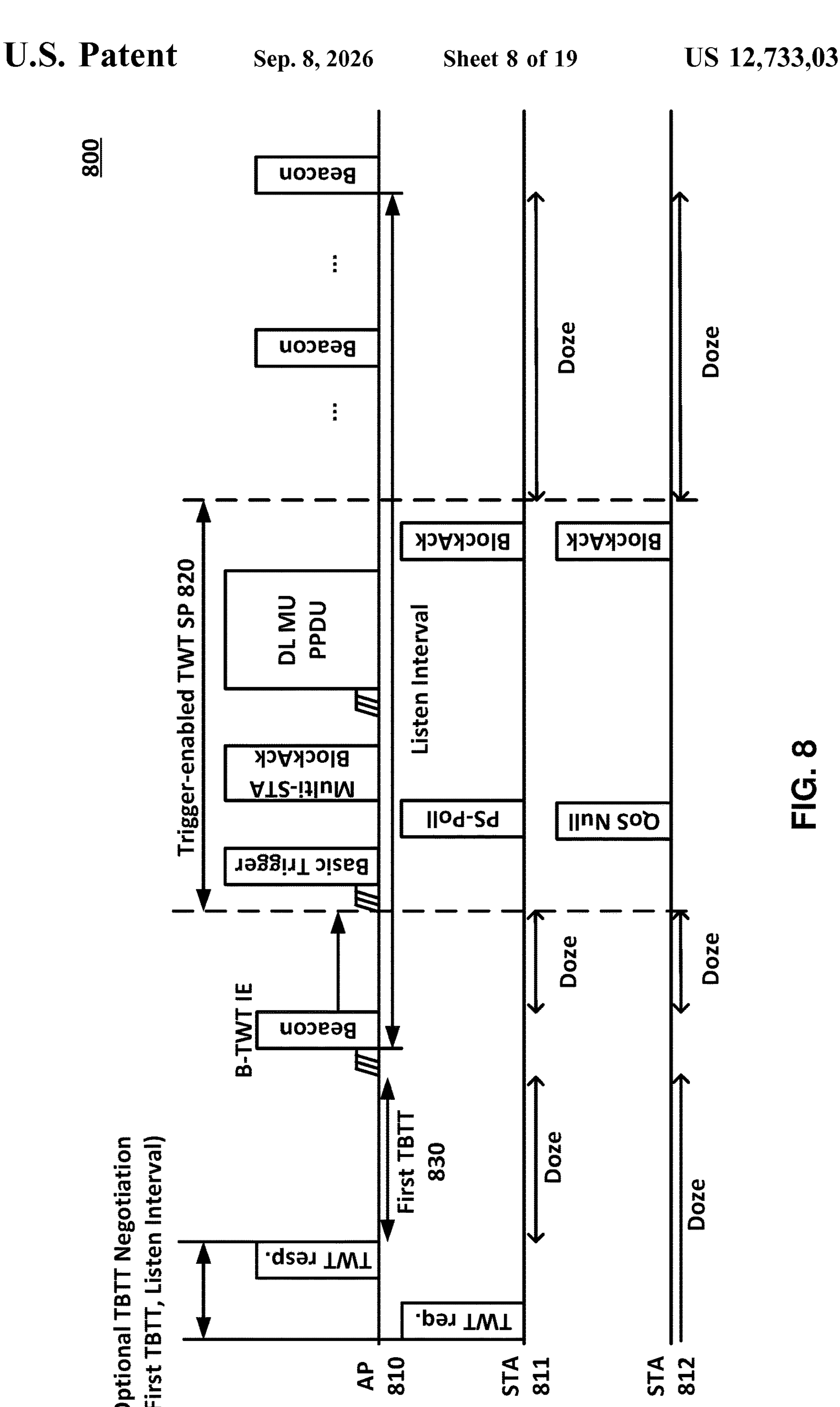
FIG. 8 illustrates an example of broadcast TWT operation.

FIG. 8 illustrates an example 800 of broadcast TWT operation. As shown in FIG. 8, example 800 includes an AP 810, a STA 811, and a STA 812. In example 800, AP 810 may be a TWT scheduling AP and STAs 811 and 812 may be TWT scheduled STAs.

In an example, AP 810 may include a broadcast TWT element in a beacon frame that indicates a broadcast TWT SP 820. During the broadcast TWT SP 820, AP 810 may transmit trigger frames or DL BUs to STA 811 and STA 812. Beacon frames may be sent by AP 810 periodically at target beacon transmission times (TBTTs). The number of time units (TUs) between consecutive TBTTs is called the beacon interval. A TU is equal to 1024 microseconds.

In an example, STA 811 and STA 812 may enter a doze state until the first target beacon transmission time (TBTT). STA 811 and STA 812 may wake up to receive the beacon frame at the first TBTT to determine the broadcast TWT. Upon reception of a broadcast TWT element in a beacon frame, STA 811 and STA 812 may re-enter the doze state until the start of trigger-enabled TWT SP 820.

During trigger-enabled TWT SP 820, AP 810 may transmit a basic trigger frame to STA 811 and STA 812. STA 811 may indicate that it is awake by transmitting a PS-Poll, and STA 812 may indicate that it is awake by transmitting a QoS null frame in response to the basic trigger frame. Subsequently, STA 811 and STA 812 may receive DL BUs from AP 810. STA 811 and STA 812 may return to the doze state outside of the TWT SP 720.

In an example, a STA that intends to operate in power save mode may negotiate a wake TBTT and a wake interval with the AP. For example, as shown in FIG. 8, STA 811 may transmit a TWT request to AP 810 that identifies a wake TBTT of the first beacon frame and a wake interval between subsequent beacon frames. AP 810 may respond with a TWT response to the TWT request confirming the wake TBTT and wake interval. After successfully completing the negotiation, STA 811 may enter a doze state until a first negotiated wake TBTT 830. STA 811 may be in an awake state to listen to the beacon frame transmitted at first negotiated wake TBTT 830. If STA 811 receives a beacon frame from AP 810 at or after TBTT 830, STA 811 may return to the doze state until the next wake TBTT unless a traffic indication map (TIM) element in a beacon frame includes a positive indication for STA 811. The STA 811 may return to the doze state after a nominal minimum TBTT wake duration time has elapsed from the TBTT start time.

A Network Allocation Vector (NAV) is an indicator, maintained by a station (STA), of time periods when transmission onto the wireless medium (WM) may not be initiated by the STA regardless of whether the clear channel assessment (CCA) function of the STA senses that the WM is busy. A STA that receives at least one valid frame in a PSDU may update its NAV with the information from any valid duration field in the PSDU. The STA may update the NAV when a value of the received duration field is greater than the current NAV value of the STA.

A TWT protection is a mechanism employed to protect a TWT session from external STA transmissions. During a TWT SP configured to protect the TWT session, a STA that initiates a transmission opportunity (TXOP) to transmit a frame may transmit a request to transmit (RTS) frame or a clear to transmit (CTS) frame to protect the TWT session by setting the NAV of other STAs based on receiving of the RTS frame and/or the CTS frame. The RTS frame may comprise a frame control field, a duration field, a receiver address (RA) field, a transmitter address (TA) field, and a frame check sequence (FCS) field. The CTS frame may comprise a frame control field, a duration field, a receiver address (RA) field, and a frame check sequence (FCS) field.

The TWT protection field in a TWT element may indicate whether a TWT is protected or unprotected. A TWT requesting STA may set the TWT protection field to 1 to request the TWT responding STA to provide protection for the set of TWT SPs. A TWT protection field equal to 1 may indicate to use a NAV protection mechanism to protect access to the medium during the corresponding TWT SPs.

Figure 9:
FIG. 9 illustrates an example of TWT protection in individual TWT operation.
Figure 9:
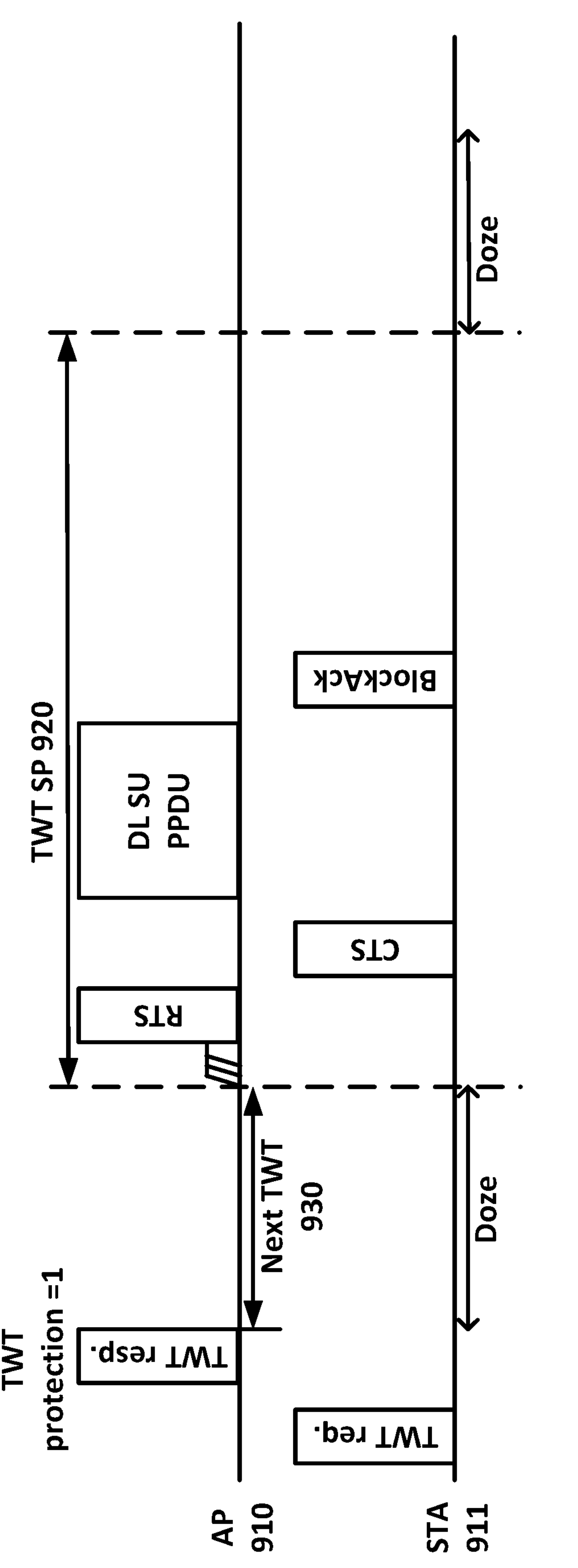

FIG. 9 illustrates an example 900 of TWT protection in individual TWT operation. As shown in FIG. 9, example 900 includes an AP 910 and a STA 911.

In an example, AP 910 may set the TWT protection field to 1 in a TWT response frame to protect the TWT SPs using a NAV protection mechanism. Upon reception of the TWT response frame, STA 911 may enter a doze state until the next TWT 930. AP 910 that has set the TWT protection field to 1 may transmit a NAV setting frame at the start of the TWT SP 920. For example, the NAV setting frame may be an RTS frame or a CTS frame.

A STA that receives the NV setting frame and that is not scheduled to access the medium during the TWT SP 920 may set their NAV according to the NAV setting frame. The STA may not access the medium for the specified amount of time in the NAV setting frame.

STA 911 may be scheduled to access the medium during the TWT SP 920. STA 911 may respond to the RTS frame with a CTS frame. Upon receiving the CTS frame, AP 910 may transmit a downlink frame to STA 911. STA 911 may respond to the downlink frame with a BA frame. When the TWT SP 920 ends, STA 911 may return to the doze state.

Traffic originating from many real time applications may have stringent latency requirements (e.g., very low average latency, worst-case latency on the order of a few to tens of milliseconds, and small jitter). Such traffic is referred to as latency sensitive traffic. Restricted TWT operation may allow an AP to use enhanced medium access protection and resource reservation mechanisms to provide more predictable latency, reduced worst case latency, and/or reduced jitter, with higher reliability for latency sensitive traffic.

Using TWT, a STA may negotiate awake periods with an AP to transmit and receive data packets. The STA may save power the rest of the time as the STA may remain in a doze state. TWT operation may thus lead to low power consumption for the participating STAs. TWT operation may also reduce the contention level and may support a collision-free and deterministic operation when STAs are distributed over different TWT sessions.

Using restricted TWT (r-TWT) operation, an AP may allocate r-TWT SP(s) that may be used for transmission of data frames with latency sensitive traffic by the AP and one or more STAs. Traffic identifiers (TIDs) of latency sensitive traffic may be indicated in a broadcast frame (e.g., beacon frame, probe response frame, etc.) sent by the AP. The TIDs may be indicated in a restricted TWT DL TID bitmap and/or a restricted TWT UL TID bitmap of a restricted TWT traffic info field of a TWT element. A data frame with a TID that is not identified as latency sensitive traffic may not be transmitted during an r-TWT SP.

A restricted TWT scheduling AP, referred to as an r-TWT scheduling AP, may be an extremely high throughput AP (EHT AP) (or a "Beyond EHT" AP) that supports restricted TWT operation. A restricted TWT scheduled STA, referred to as an r-TWT scheduled STA, is a non-AP EHT STA (or a non-AP "Beyond EHT" STA) that supports restricted TWT operation. When a restricted TWT agreement is set up, the EHT AP may announce a restricted TWT SP (r-TWT SP) schedule information in a broadcast TWT element. The broadcast TWT element may be contained in a management frame such as a beacon frame or a probe response frame.

The EHT AP may schedule a quiet interval that overlaps with a restricted TWT SP. The quiet interval may have a duration of 1 TU. The quiet interval may start at the same time as the corresponding r-TWT SP. A quiet interval may be scheduled by including a quiet element in a beacon frame and/or a probe response frame. Legacy STAs may not be permitted to initiate a frame transmission during the quiet interval overlapping with the r-TWT SP.

Figure 10:
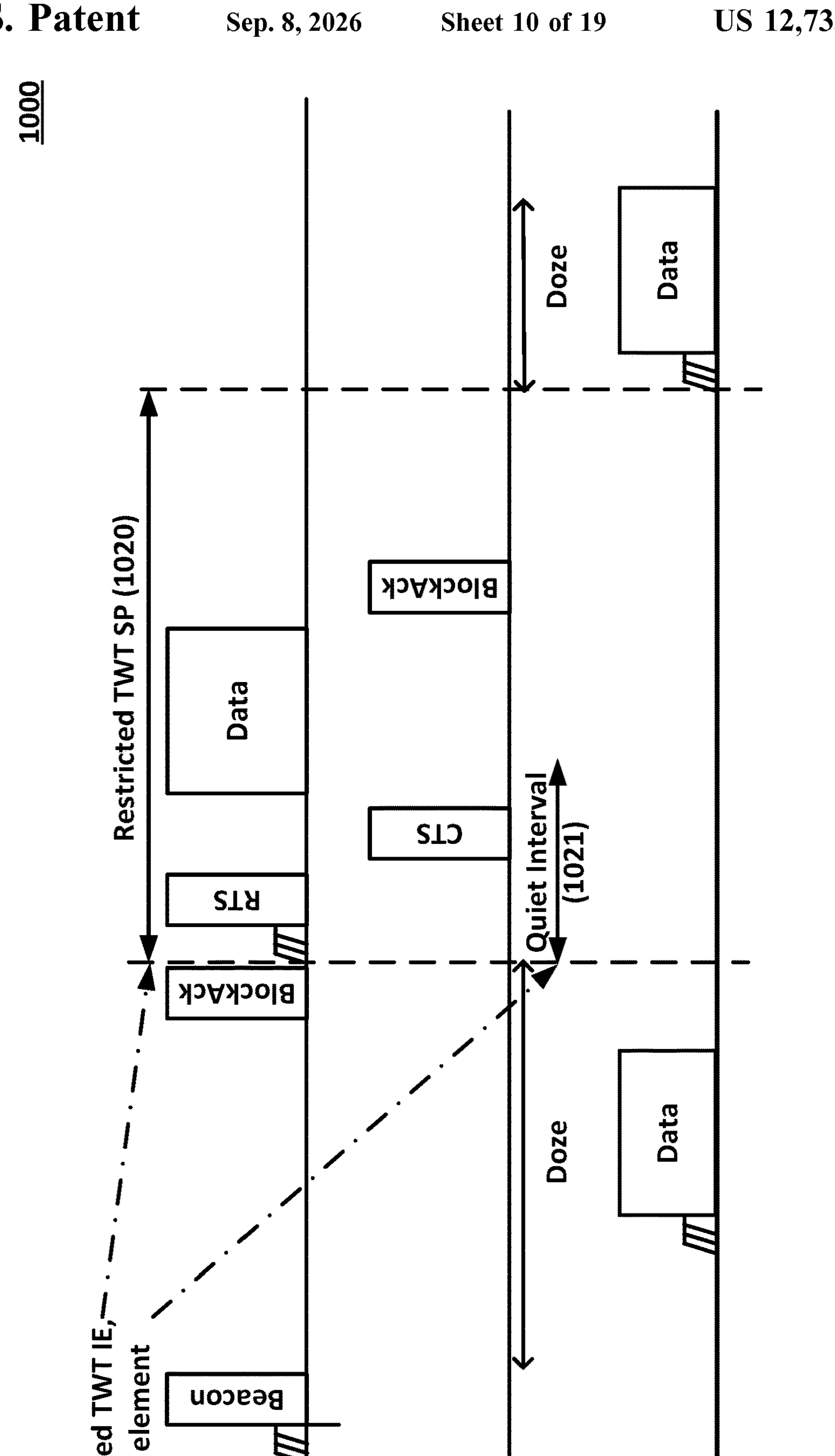
FIG. 10 illustrates an example of restricted TWT (r-TWT) operation.

FIG. 10 illustrates an example 1000 of restricted TWT operation. As shown in FIG. 10, example 1000 includes an AP 1010, a first STA 1011, and a second STA 1012.

In an example, a restricted TWT agreement may be setup between AP 1010 and STA 1011. The r-TWT agreement may not include STA 1012. For example, STA 1012 may be a legacy STA or an EHT STA not scheduled by AP 1010 as part of the r-TWT agreement.

In an example, AP 1010 may transmit a beacon frame including a TWT element that indicates an r-TWT SP 1020 and TIDs allowed to be transmitted during the r-TWT SP 1020. The beacon frame may also include a quiet element indicating a quiet interval 1021.

Upon receiving the beacon frame, STA 1011 may enter a doze state and may remain in the doze state until the start of r-TWT SP 1020. STA 1012, which is not scheduled by AP 1010 for the r-TWT SP 1020, may transmit a data frame after receiving the beacon frame. However, STA 1012 must end its transmission before the start of r-TWT SP 1020.

During the r-TWT SP 1020, AP 1010 and STA 1011 may exchange an RTS frame and a CTS frame. Subsequently, AP 1010 may send a data frame to STA 1011. The data frame includes traffic having a TID from among the TIDs indicated as permitted to transmit during r-TWT SP 1020 (i.e., latency sensitive traffic) in the beacon frame. STA 1012 may not access the channel at least during quiet interval 1021 indicated in the beacon frame. When quiet interval 1021 or r-TWT SP 1020 ends, STA 1012 may resume its transmission. STA 1011 may enter doze state at the end of r-TWT SP 1020.

In existing WLAN systems, an AP may allocate a trigger-enabled TWT SP to a STA that supports TWT operation. The allocated STA may be allowed to transmit a frame during the trigger-enabled TWT SP after receiving a trigger frame from the AP. That is, the STA may not transmit a frame by using EDCA (Enhanced Distributed Channel Access) operation during the trigger-enabled TWT SP.

In an example, an AP may allocate a trigger-enabled r-TWT SP to a STA that supports r-TWT operation. In a trigger-enabled r-TWT SP, the r-TWT scheduling AP may first trigger member r-TWT scheduled STAs to allow them to deliver their QoS data frames first. The QoS data frames may correspond to TIDs that are associated with the trigger-enabled r-TWT SP. In a triggered-enabled r-TWT SP, a member r-TWT scheduled STA may transmit an UL frame to a r-TWT scheduling AP in response to a trigger frame received from the AP. In a triggered-enabled r-TWT SP, a transmission of the member r-TWT scheduled STA may not be allowed by using EDCA.

Figure 11:
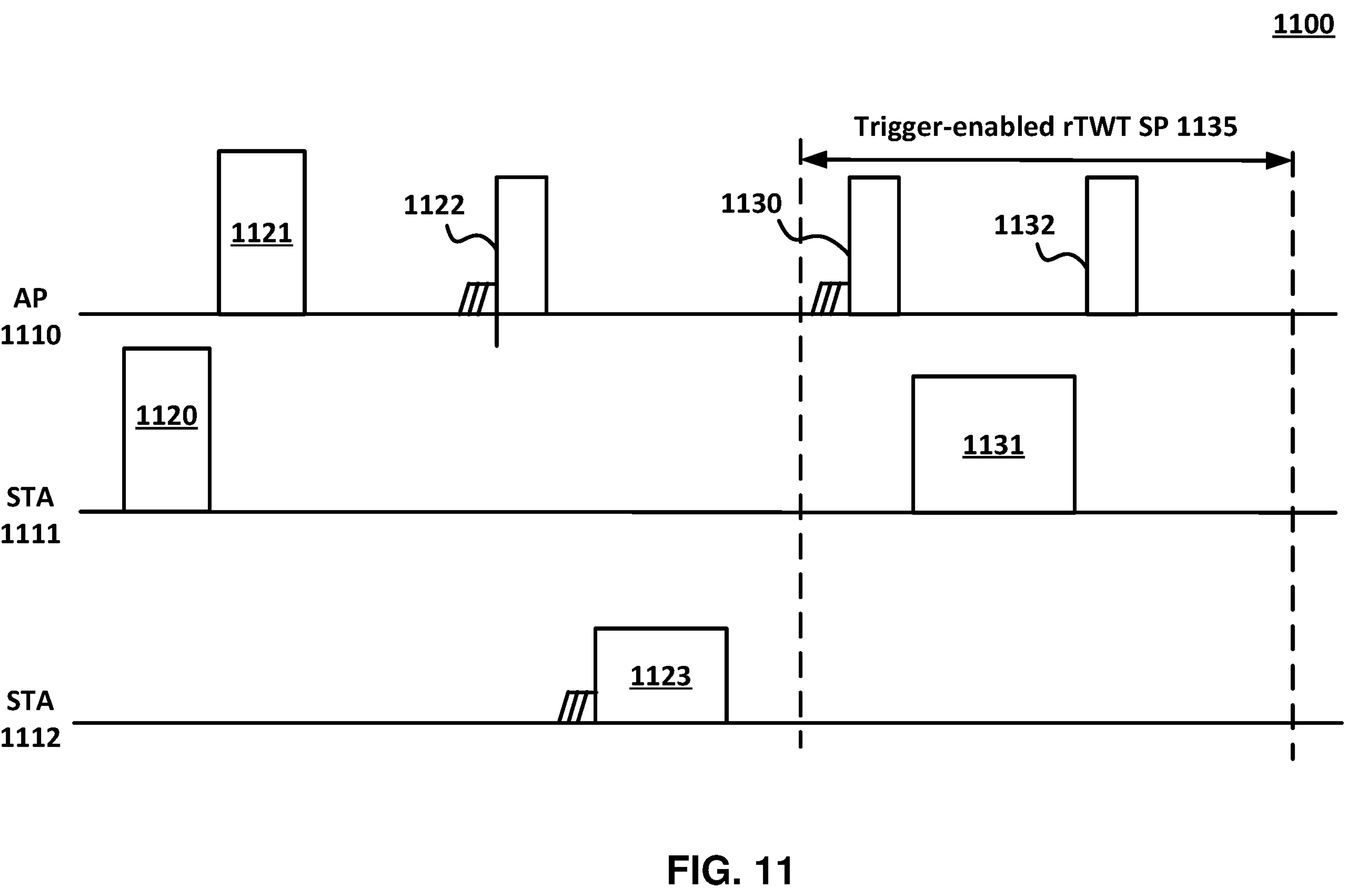
FIG. 11 illustrates an example of trigger-enabled (TE) r-TWT operation.

FIG. 11 illustrates an example 1100 of trigger-enabled r-TWT SP operation. As shown in FIG. 11, example 1100 includes an AP 1110, a STA 1111, and a STA 1112.

In an example, STA 1111 may transmit a TWT setup request frame 1120 to AP 1110. TWT setup request frame 1120 may include first parameters for a trigger-enabled r-TWT. In response to frame 1120, AP 1110 may transmit a TWT setup response frame 1121 to STA 1111. TWT setup response frame 1121 may include second parameters for the trigger-enabled r-TWT. The second parameters may or may not be the same as the first parameters.

In an example, TWT setup request frame 1120 and/or TWT setup response frame 1121 may comprise TID bitmaps indicating TIDs corresponding to DL or UL traffic. The DL/UL traffic indicated in the TID bitmaps may represent DL/UL traffic that may be transmitted during a service period of the trigger-enabled r-TWT.

Upon successful TWT setup by exchanging TWT setup request frame 1120 and TWT setup response frame 1121, STA 1111 may be a member r-TWT scheduled STA of the trigger-enabled r-TWT. In other words, STA 1111 may be allowed to transmit in response to a received trigger frame during a service period of the triggered-enabled r-TWT.

Subsequently, AP 1110 may transmit a beacon frame 1122 comprising a TWT element indicating scheduling information of the trigger-enabled r-TWT. The scheduling information may indicate a start time and an end time of a trigger-enabled r-TWT SP 1135 of the trigger-enabled r-TWT. In an example, frame 1122 may be other than a beacon frame. For example, frame 1122 may be a broadcast probe response frame, a fast initial link setup (FILS) discovery frame, or a traffic indication map (TIM) broadcast frame.

In an example, STA 1112 may not be a member r-TWT scheduled STA of the trigger-enabled r-TWT. As shown in FIG. 11, STA 1112 may transmit a data frame 1123 by using EDCA before the start of the trigger-enabled r-TWT SP 1135. However, STA 1112 stops transmitting data frame 1123 before the start of the trigger-enabled r-TWT SP 1135.

At the start of the trigger-enabled r-TWT SP 1135, AP 1110 may transmit a trigger frame 1130 to STA 1111. In response to trigger frame 1130, STA 1111 may transmit a TB PPDU 1131 to AP 1110. TB PPDU 1131 may include UL traffic that is permitted to be transmitted during the trigger-enabled r-TWT SP 1135, i.e., having a TID that belongs to the TIDs indicated in the TID bitmaps exchanged by frames 1120 and 1121. AP 1110 may transmit a Block Ack (BA) frame 1132 in response to TB PPDU 1131. BA frame 1132 may be a multi-STA BA frame or a compressed BA frame.

Figure 12:
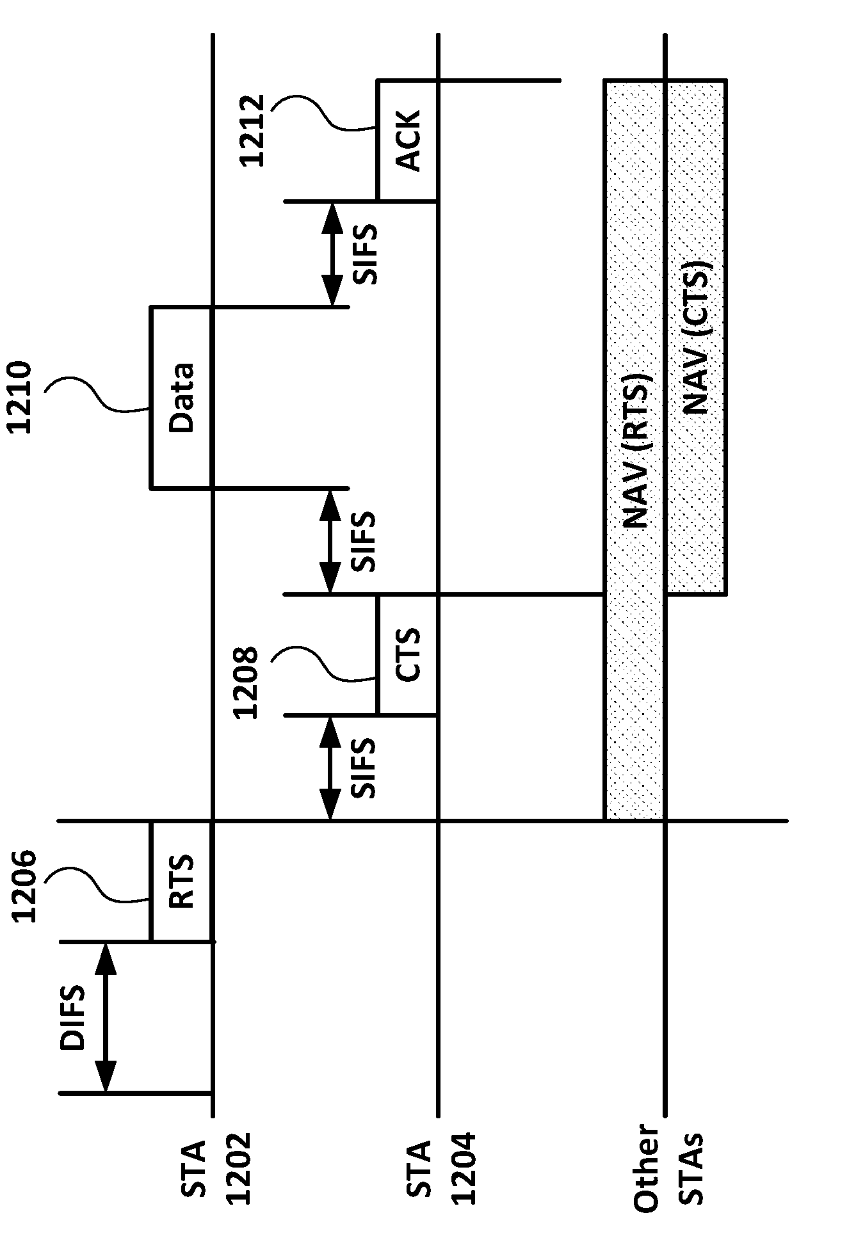
FIG. 12 illustrates an example Request-to-Send (RTS)/Clear-to-Send (CTS) procedure.

FIG. 12 illustrates an example 1200 of a Request-to-Send (RTS)/Clear-to-Send (CTS) procedure. Example 1200 may be an example according to the RTS/CTS procedure as defined in section 10.3.2.9 of the IEEE 802.11 standard draft "IEEE P802.11-REVme™/D1.3, June 2022." As shown in FIG. 12, example 1200 may include STAs 1202 and 1204. Other STAs of the same BSS may also be within communication range of STAs 1202 and 1204.

Example 1200 may begin with STA 1202 transmitting an RTS frame 1206 to STA 1204. STA 1202 may transmit RTS frame 1206 to protect from hidden STA(s) the transmission of a data frame 1210 that STA 1202 intends to transmit to STA 1204. RTS frame 1206 may include a Duration/ID field. The Duration/ID field may be set to the time, in microseconds, required to transmit data frame 1210, plus one CTS frame, plus one ACK frame (if required), plus three SIFS (Short Interframe Spacing) periods.

In an example, STA 1204 may respond to RTS frame 1206 by transmitting a CTS frame 1208 to STA 1202. CTS frame 1208 may be transmitted one SIFS period after RTS frame 1206. STA 1204 may respond to RTS frame 1206 when RTS frame 1206 is addressed to STA 1204 and after considering the NAV, unless the NAV was set by a frame originating from STA 1202. STA 1204 may respond to the RTS frame 1206 when RTS frame 1206 is addressed to STA 1204 and if the NAV indicates idle. For a non-SIG STA, the NAV indicates idle when the NAV count is 0 or when the NAV count is non-zero but a nonbandwidth signaling TA obtained from a TA field of RTS frame 1206 matches a saved TXOP holder address. For an S1G STA, the NAV indicates idle when both the NAV and RID (response indication deferral) counters are 0 or when either the NAV or RID counter is non-zero but the TA field of RTS frame 1206 matches the saved TXOP holder address.

STA 1204 may set an RA field of CTS frame 1208 to a nonbandwidth signaling TA obtained from the TA field of RTS frame 1206. STA 1204 may set a Duration field of CTS frame 1208 based on the Duration/ID field of RTS frame 1206, namely as equal to the value of the Duration/ID field of RTS frame 1206, adjusted by subtracting the time required to transmit CTS frame 1208 and one SIFS period.

Upon receiving CTS frame 1208, STA 1202 may wait one SIFS period before transmitting data frame 1210. STA 1204 may transmit an ACK frame 1212 in response to data frame 1210. STA 1204 may transmit ACK frame 1212 one SIFS after receiving data frame 1210.

As shown in example 1200, other STAs within communication range of STAs 1202 and 1204, and belonging to the same BSS, may set their NAVs according to RTS frame 1206 and/or CTS frame 1208. For example, a STA receiving RTS frame 1206 may set its NAV based on the Duration/ID field of RTS frame 1206. Another STA receiving CTS frame 1208 may set its NAV based on the Duration field of CTS frame 1208. As such, the other STAs may not access the channel using EDCA until the end of transmission of ACK frame 1212.

Figure 13:
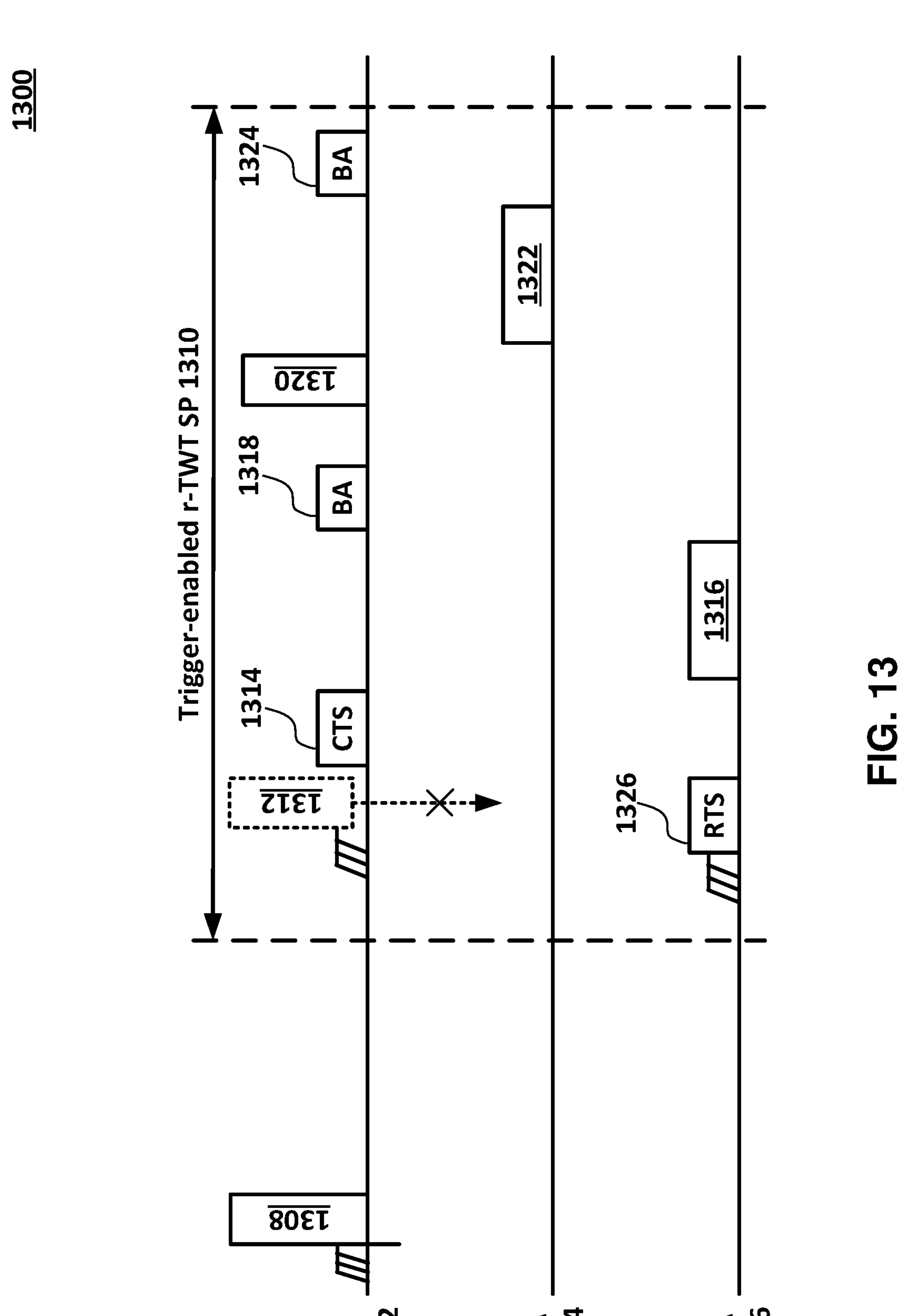
FIG. 13 illustrates an example TE r-TWT operation.

FIG. 13 illustrates an example 1300 of TE r-TWT operation. As shown in FIG. 13, example 1300 includes an AP 1302, a STA 1304, and a STA 1306. In an example, AP 1302 may transmit a frame 1308 indicating a TE r-TWT SP 1310 of a TE r-TWT setup by AP 1302. Frame 1308 may be a beacon frame, for example. In example 1300, STA 1304 may be a member r-TWT scheduled STA of the TE r-TWT, while STA 1306 may be a non-member of the TE r-TWT. STA 1306 may be a non-HE (pre-HE) or a non-EHT (pre-EHT) STA, a non-r-TWT scheduled STA (an EHT STA that does not support r-TWT), or an r-TWT scheduled STA that is not a member of the TE r-TWT.

According to existing IEEE 802.11 rules, as a member of the TE r-TWT, STA 1304 may transmit during TE r-TWT SP 1310 in response to receiving a trigger frame from r-TWT scheduling AP 1302. STA 1304, however, may not transmit using EDCA during TE r-TWT SP 1310. In contrast, as a non-member of the TE r-TWT, STA 1306 may access the channel using EDCA during TE r-TWT SP 1310.

In example 1300, STA 1306 may transmit an RTS frame 1326 to AP 1302 during r-TWT SP 1310. As discussed above, AP 1302 may respond to RTS frame 1326 when RTS frame 1326 is addressed to AP 1302 and if the NAV indicates idle. In example 1300, AP 1302 may transmit a CTS frame 1314 to STA 1306 in response to RTS frame 1326. STA 1306 may then transmit a data frame 1316 to AP 1302. AP 1302 may acknowledge data frame 1316 by transmitting a BA frame 1318 to STA 1306.

According to example 1300, the transmission of RTS frame 1326 by non-member STA 1306 may delay AP 1302 from transmitting a trigger frame 1312 to member STA 1304 to allow STA 1304 to transmit/receive latency sensitive traffic associated with the TE r-TWT during TE r-TWT SP 1310. For example, as shown in FIG. 13, AP 1302 may cancel/delay the transmission of a trigger frame 1312 to STA 1304 upon receiving RTS frame 1326 from STA 1306. Only after AP 1302 acknowledges data frame 1316 from non-member STA 1306, AP 1302 may transmit a trigger frame 1320 to STA 1304, which allows STA 1304 to transmit a data frame 1322 containing latency-sensitive traffic to AP 1302. AP 1302 may acknowledge data frame 1322 by transmitting a BA frame 1324 to STA 1304.

In other examples, the presence of multiple non-member STAs may prevent altogether AP 1302 from transmitting a trigger frame to member STA 1304 during TE r-TWT SP 1310. As such, member STA 1304 may not be able to transmit/receive any latency-sensitive traffic during TE r-TWT SP 1310 scheduled for STA 1304 by AP 1302.

Figure 14:
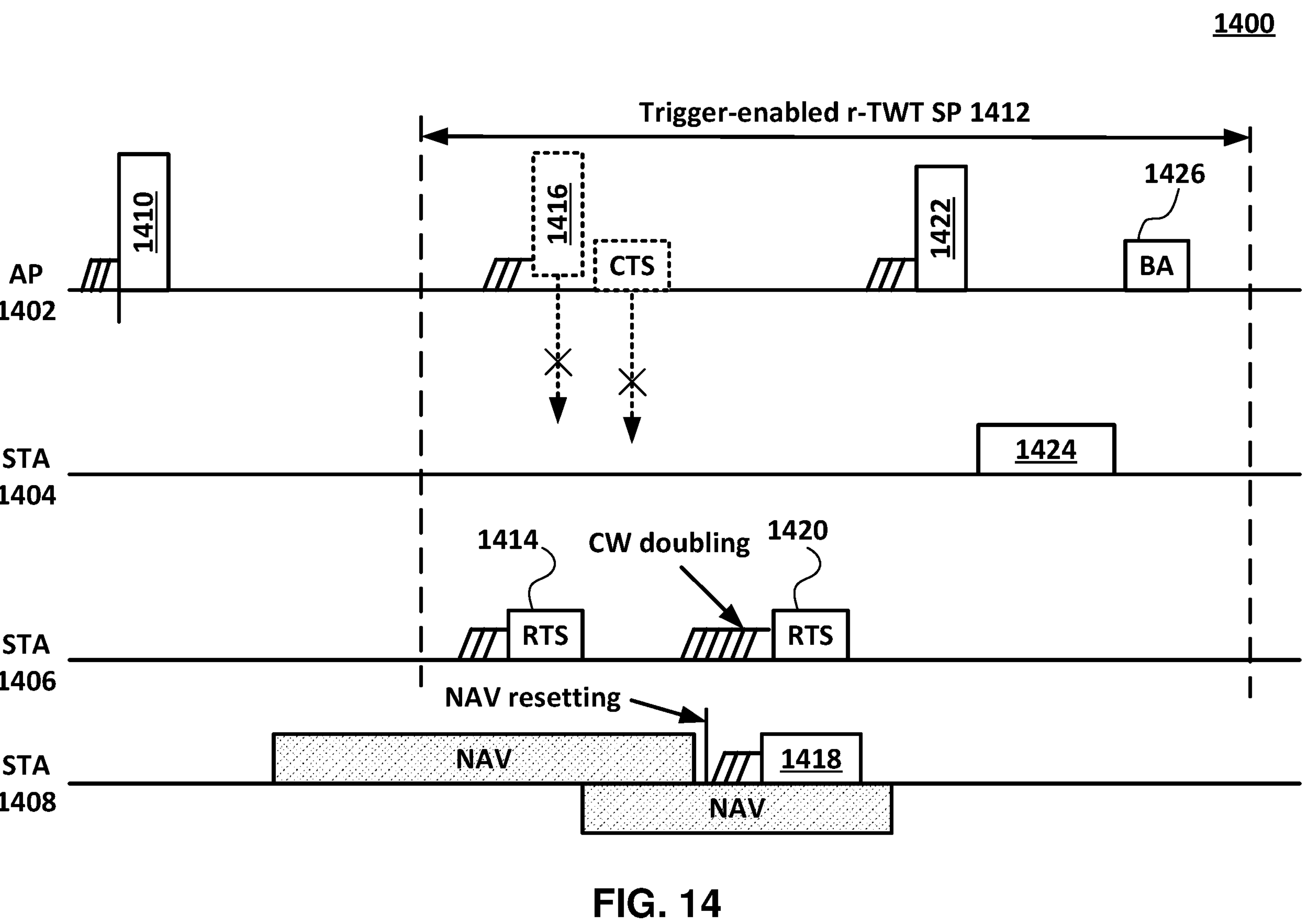
FIG. 14 illustrates an example TE r-TWT operation.

One solution to the above-described problem includes configuring an r-TWT scheduling AP to not transmit a CTS frame in response to an RTS frame received from a non-member STA during an r-TWT SP. FIG. 14 illustrates an example 1400 of TE r-TWT operation according to this proposed solution.

As shown in FIG. 14, example 1400 includes an AP 1402 and STAs 1404, 1406, and 1408. In an example, AP 1402 may transmit a frame 1410 indicating a TE r-TWT SP 1412 of a TE r-TWT setup by AP 1402. Frame 1410 may be a beacon frame, for example. In example 1400, STA 1404 may be a member r-TWT scheduled STA of the TE r-TWT, while STA 1406 may be a non-member of the TE r-TWT. STA 1406 may be a non-HE (pre-HE) or non-EHT (pre-EHT) STA, a non-r-TWT scheduled STA (an EHT or non-EHT STA that does not support r-TWT), or an r-TWT scheduled STA that is not a member of the TE r-TWT. STA 1408 may be a STA within communication range of AP 1402, STA 1404, and/or STA 1406. STA 1408 may or may not be a member of the TE r-TWT.

According to existing IEEE 802.11 rules, as a member of the TE r-TWT, STA 1404 may transmit during TE r-TWT SP 1412 in response to receiving a trigger frame from r-TWT scheduling AP 1402. STA 1404 however may not transmit using EDCA during TE r-TWT SP 1412. In contrast, as a non-member of the TE r-TWT, STA 1406 may access the channel using EDCA during TE r-TWT SP 1412.

In example 1400, STA 1406 may transmit an RTS frame 1414 to AP 1402 during r-TWT SP 1412. The transmission of RTS frame 1414 by STA 1406 may cause AP 1402 to cancel/delay transmission of a trigger frame 1416 to member STA 1404 to allow STA 1404 to transmit/receive latency sensitive traffic associated with the TE r-TWT during TE r-TWT SP 1412. In an example, STA 1408 may have a non-zero NAV when STA 1408 receives RTS frame 1414. STA 1408 may set/update its NAV from an initial value to a value based on the Duration field of RTS frame 1414. The NAV of STA 1408 may increase based on receiving RTS frame 1414.

AP 1402 may not respond to RTS frame 1414 with a CTS frame, even when RTS frame 1414 is addressed to AP 1402 and the NAV indicates idle at AP 1402. When STA 1406 does not receive a CTS frame from AP 1402, STA 1406 may attempt re-transmission by transmitting an RTS frame 1420 to AP 1402. STA 1406 may use a lower modulation and coding scheme (MCS) and/or a larger contention window (CW) for RTS frame 1420.

Having received RTS frame 1414 from STA 1406, but no other subsequent frame within a NAV timeout period (e.g., no PHY-TXSTART.indication primitive is received from the PHY during a NAVTimeout period starting from when the MAC received a PHY-RXEND.indication primitive corresponding to the detection of RTS frame 1414), STA 1408 may set its NAV to another value lower than the value based on the Duration field of RTS frame 1414. For example, STA 1408 may set its NAV to the initial value that STA 1408 had before receiving RTS frame 1414. Subsequently, STA 1408 may attempt to access the channel to transmit a frame 1418. Frame 1418 may collide with RTS frame 1420 being transmitted by STA 1406.

Thus, according to example 1400, the transmission of RTS frame 1414 by non-member STA 1406 may delay AP 1402 from transmitting a trigger frame to member STA 1404. The non-response to RTS frame 1414 by AP 1402 may cause STA 1406 to attempt re-transmission of the RTS frame. The re-transmission of the RTS frame by STA 1406 may be unsuccessful due to collision with a frame 1418 transmitted by STA 1408. As such, AP 1402, STA 1406, and/or STA 1408 may be delayed from accessing the channel during r-TWT SP 1412. Notably, in example 1400, AP 1402 may only transmit a subsequent trigger frame 1422 to STA 1404 after a non-negligible portion of r-TWT SP 1412 has elapsed. In response, STA 1404 may transmit a data frame 1424 containing latency-sensitive traffic to AP 1402, which may acknowledge data frame 1424 by transmitting a BA frame 1426 to STA 1404. However, r-TWT SP 1412 may elapse before STA 1404 has emptied its queue(s) of latency-sensitive traffic.

Embodiments of the present disclosure, as further described below, address the above-described problems of existing TE r-TWT operation. In one aspect, an AP may transmit to a first STA a first frame indicating a TW r-TWT SP of a TE r-TWT setup by the AP and the first STA. The AP receives from a second STA an RTS frame during the TE r-TWT SP, where the second AP is not a member of the TE r-TWT. The second STA may be a non-r-TWT scheduled STA or an r-TWT scheduled STA. In response to the RTS frame, the AP transmits a second frame deferring channel access by the second STA during the TE r-TWT SP. Deferral of channel access by the second STA allows timely transmission of latency-sensitive traffic by the first STA to the AP.

Figure 15:
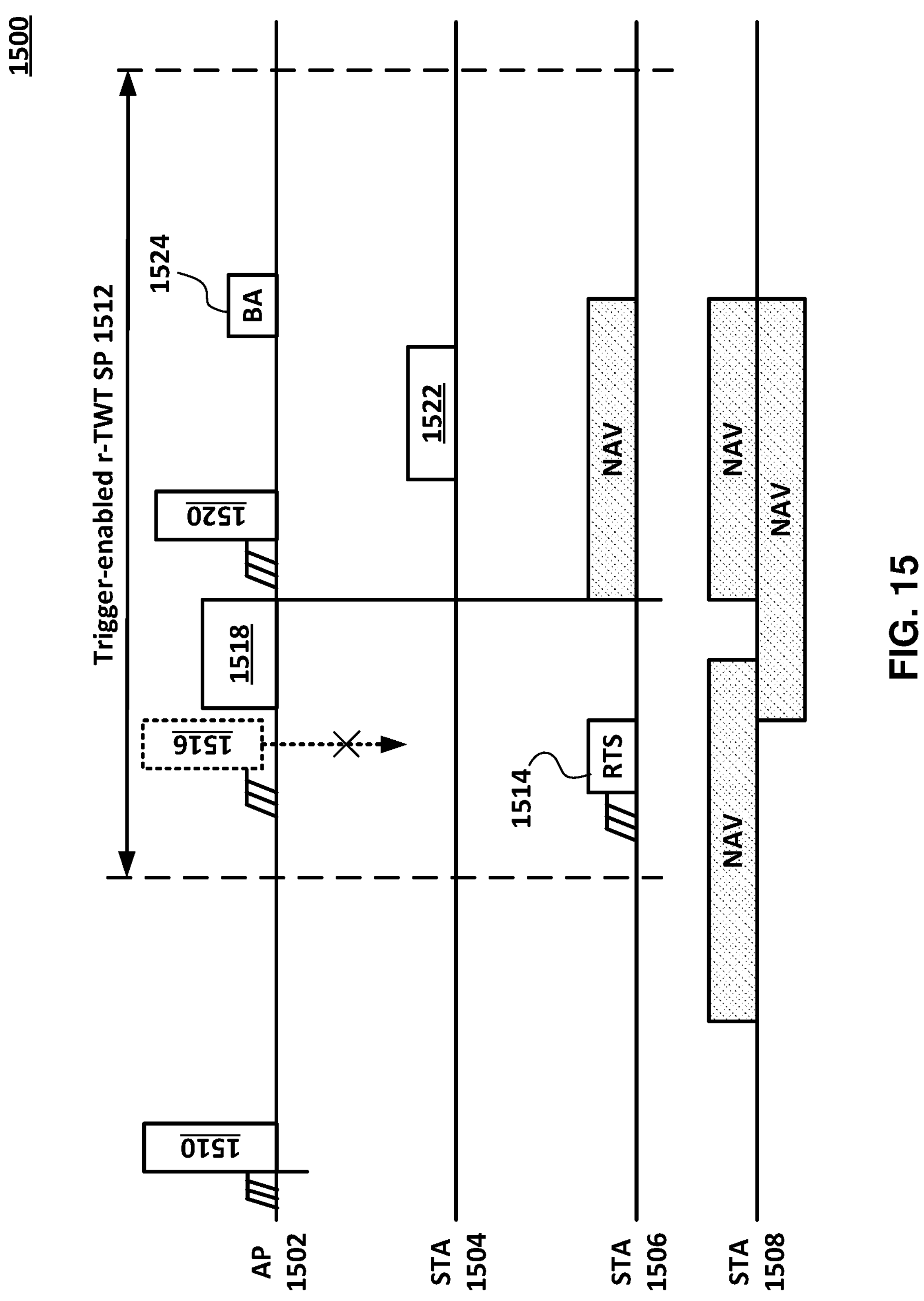
FIG. 15 illustrates an example TE r-TWT operation according to an embodiment.

FIG. 15 illustrates an example 1500 of TE r-TWT operation according to an embodiment. Example 1500 is provided for the purpose of illustration only and is not limiting of embodiments. As shown in FIG. 15, example 1500 includes an AP 1502 and STAs 1504, 1506, and 1508. In an example, AP 1502 may transmit a frame 1510 indicating a TE r-TWT SP 1512 of a TE r-TWT setup by AP 1502. Frame 1510 may be a beacon frame, for example.

In example 1500, STA 1504 may be a member r-TWT scheduled STA of the TE r-TWT, while STA 1506 may be a non-member of the TE r-TWT. STA 1506 may be a non-HE (pre-HE) or non-EHT (pre-EHT) STA, a non-r-TWT scheduled STA (an EHT STA that does not support r-TWT), or an r-TWT scheduled STA that is not a member of the TE r-TWT. STA 1508 may be a STA within communication range of AP 1502, STA 1504, and/or STA 1506. STA 1508 may or may not be a member of the TE r-TWT.

According to existing IEEE 802.11 rules, as a member of the TE r-TWT, STA 1504 may transmit during TE r-TWT SP 1512 in response to receiving a trigger frame from r-TWT scheduling AP 1502. STA 1504 however may not transmit using EDCA during TE r-TWT SP 1512. In contrast, as a non-member of the TE r-TWT, STA 1506 may access the channel using EDCA during TE r-TWT SP 1512.

In example 1500, STA 1506 may transmit an RTS frame 1514 to AP 1502 during r-TWT SP 1512. The transmission of RTS frame 1514 by STA 1506 may cause AP 1502 to cancel/delay transmission of a trigger frame 1516 to member STA 1504 to allow STA 1504 to transmit/receive latency sensitive traffic associated with the TE r-TWT during TE r-TWT SP 1512. In an example, STA 1508 may have a non-zero NAV when STA 1508 receives RTS frame 1514. STA 1508 may set/update its NAV from an initial value to a value based on the Duration field of RTS frame 1514. The NAV of STA 1508 may increase based on receiving RTS frame 1514.

In an embodiment, AP 1502 may respond to RTS frame 1514 from STA 1506 by transmitting a (modified) CTS frame 1518. In an embodiment, AP 1502 may transmit CTS frame 1518 in response to RTS frame 1514 when the NAV indicates idle. CTS frame 1518 may be configured to cause deferral of channel access by STA 1506. CTS frame 1518 may include an indication to STA 1506 to defer channel access. In an embodiment, a receiver address (RA) field of CTS frame 1518 is set based on a transmitter address (TA) field of RTS frame 1514 with an Individual/Group bit of the TA field set to 1. In an embodiment, an RA field of CTS frame 1518 is set based on a TA field of RTS frame 1514 with bit 0 of the TA field set to 1. In an embodiment, an RA field of CTS frame 1518 is based on a Medium Access Control (MAC) address of STA 1506 with bit 0 of the MAC address of STA 1506 set to 1.

Based on the indication included in CTS frame 1518, STA 1506 may defer its channel access to transmit over the wireless medium. For example, as shown in FIG. 15, STA 1506 may set its NAV to a non-zero value based on receiving CTS frame 1518. In an embodiment, CTS frame 1518 includes a duration field that indicates a period of channel access deferral by STA 1506. STA 1506 may set its NAV based on the period of channel access deferral included in the duration field of CTS frame 1518.

In an embodiment, a value of the duration field of CTS frame 1518 may be based on a value of a duration field of RTS frame 1514. In an embodiment, the value of the duration field of CTS frame 1518 may be equal to the value of the duration of field of RTS frame 1514, minus the time required to transmit CTS frame 1518, and minus the duration of a Short Interframe Spacing (SIFS) period. As such, CTS frame 1518 may not increase or change the NAV of some of the STA(s) receiving CTS frame 1518. For example, as shown in FIG. 15, STA 1508 may update its NAV based on receiving CTS frame 1518. As the duration field of CTS frame 1518 is set based on the duration field of RTS frame 1514, the updated NAV of STA 1508 may be equal to the previous NAV of STA 1508 set based on receiving RTS frame 1514. In other embodiments, the duration field of CTS frame 1518 may be set so as to result in a longer or shorter NAV at STA 1506 and/or STA 1508. The value of the duration field of CTS frame 1518 may also be set independent of the value of the duration field of RTS frame 1514.

After transmitting CTS frame 1518, AP 1502 may proceed to transmit a trigger frame 1520 to member STA 1504. In response, STA 1504 may transmit a data frame 1522 containing latency-sensitive traffic to AP 1502, which may acknowledge data frame 1522 by transmitting a BA frame 1524 to STA 1504. As non-member STA 1506 has deferred its channel access based on CTS frame 1518, the transmission of trigger frame 1520 may not be disturbed by non-member STA 1506. Member STA 1504 may transmit its latency sensitive traffic earlier within r-TWT SP 1512 and may thus succeed in emptying its queue(s) of latency-sensitive traffic during r-TWT SP 1512.

Non-member STA 1506 may attempt re-transmission of RTS frame 1514 when its NAV returns to zero, possibly during r-TWT SP 1512. As AP 1502 responds to RTS frame 1514 by transmitting CTS frame 1518, STA 1506 may not resort to a lower MCS and/or a larger CW for the re-transmission of the RTS frame. As such, transmission overhead as well as channel access delay by STA 1506 are not increased unnecessarily.

In an embodiment, a non-member STA (e.g., a non-member STA other than STA 1506 that transmitted RTS frame 1514) of the r-TWT may set its NAV based on CTS frame 1518, thereby deferring channel access based on CTS frame 1518. The non-member STA may be a non-HE (pre-HE) or non-EHT (pre-EHT) STA (implemented so as to be able to interpret a modified CTS frame 1518), a non-r-TWT scheduled STA (an EHT STA that does not support r-TWT), or an r-TWT scheduled STA that is not a member of the TE r-TWT.

In an embodiment, a member STA of the r-TWT (e.g., STA 1504) may not set its NAV based on CTS frame 1518 (i.e., may ignore the NAV setting indicated in CTS frame 1518). As such, channel access of member STAs during the r-TWT SP is not affected by CTS frame 1518.

In an embodiment, an r-TWT scheduled STA (an EHT STA that supports r-TWT) may not set its NAV based on CTS frame 1518 (i.e., may ignore the NAV setting indicated in CTS frame 1518). As such, channel access of r-TWT scheduled STAs during the r-TWT SP is not affected by CTS frame 1518.

Figure 16:
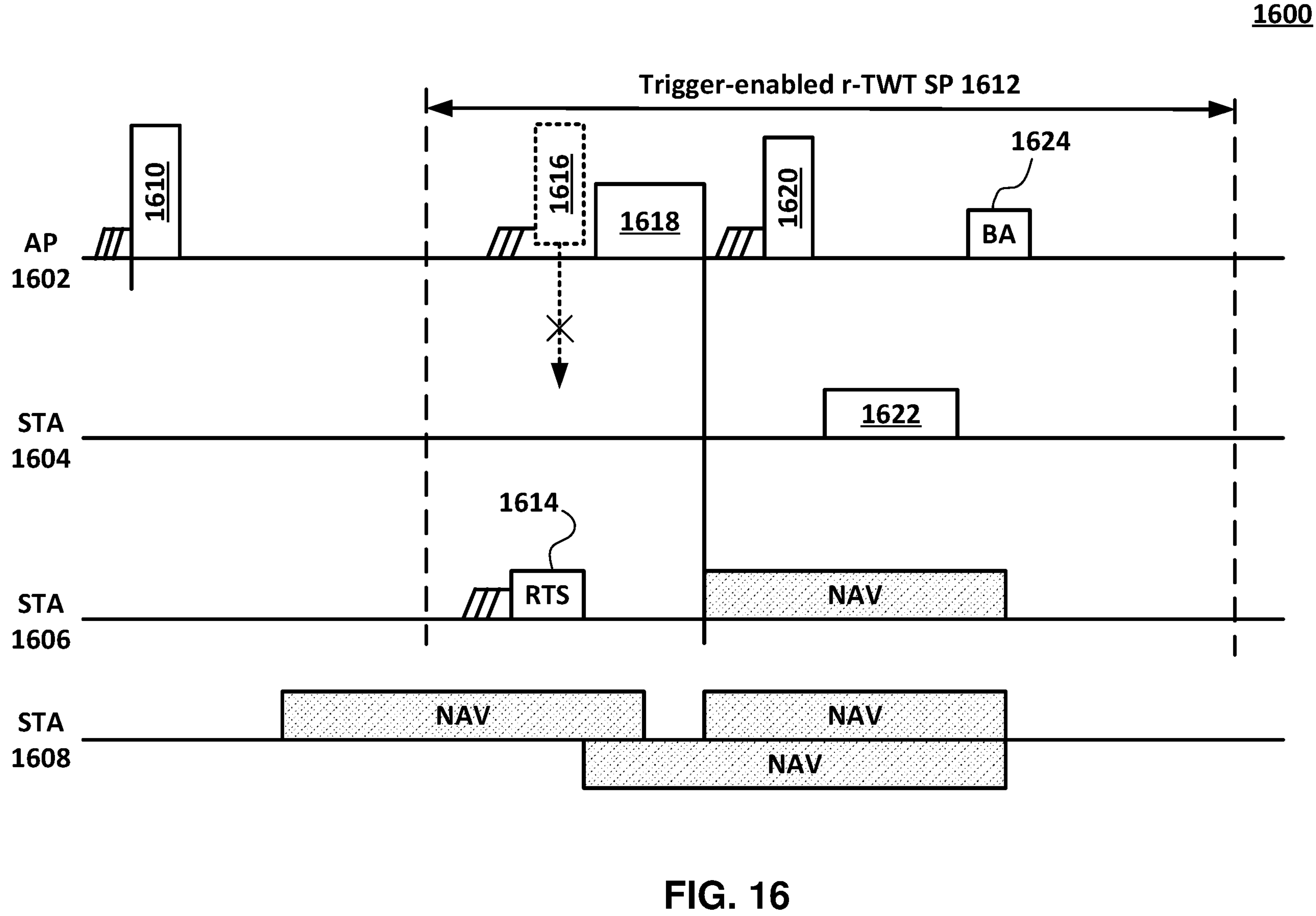
FIG. 16 illustrates an example TE r-TWT operation according to an embodiment.

FIG. 16 illustrates an example 1600 of TE r-TWT operation according to an embodiment. Example 1600 is provided for the purpose of illustration only and is not limiting of embodiments. As shown in FIG. 16, example 1600 includes an AP 1602 and STAs 1604, 1606, and 1608. In an example, AP 1602 may transmit a frame 1610 indicating a TE r-TWT SP 1612 of a TE r-TWT setup by AP 1602. Frame 1610 may be a beacon frame, for example.

In example 1600, STA 1604 may be a member r-TWT scheduled STA of the TE r-TWT, while STA 1606 may be a non-member of the TE r-TWT. STA 1606 may be a non-HE (pre-HE) or non-EHT (pre-EHT) STA, a non-r-TWT scheduled STA (an EHT STA that does not support r-TWT), or an r-TWT scheduled STA that is not a member of the TE r-TWT. STA 1608 may be a STA within communication range of AP 1602, STA 1604, and/or STA 1606. STA 1608 may or may not be a member of the TE r-TWT.

According to existing IEEE 802.11 rules, as a member of the TE r-TWT, STA 1604 may transmit during TE r-TWT SP 1612 in response to receiving a trigger frame from r-TWT scheduling AP 1602. STA 1604 however may not transmit using EDCA during TE r-TWT SP 1612. In contrast, as a non-member of the TE r-TWT, STA 1606 may access the channel using EDCA during TE r-TWT SP 1612.

In example 1600, STA 1606 may transmit an RTS frame 1614 to AP 1602 during r-TWT SP 1612. The transmission of RTS frame 1614 by STA 1606 may cause AP 1602 to cancel/delay transmission of a trigger frame 1616 to member STA 1604 to allow STA 1604 to transmit/receive latency sensitive traffic associated with the TE r-TWT during TE r-TWT SP 1612. In an example, STA 1608 may have a non-zero NAV when STA 1608 receives RTS frame 1614. STA 1608 may set/update its NAV from an initial value to a value based on the Duration field of RTS frame 1614. The NAV of STA 1608 may increase based on receiving RTS frame 1614.

In an embodiment, AP 1602 may respond to RTS frame 1614 from STA 1606 by transmitting a CTS-to-self frame 1618. In an embodiment, AP 1602 may transmit CTS-to-self frame 1618 in response to RTS frame 1614 when the NAV indicates idle. CTS-to-self frame 1618 may be configured to cause deferral of channel access by STA 1606. In an embodiment, a receiver address (RA) field of CTS-to-self frame 1618 is set based on a MAC address of AP 1602.

STAs receiving CTS-to-self frame 1618 may or may not set/update their NAVs based on CTS-to-self frame 1618 as further described below.

In an embodiment, a non-member STA of the r-TWT may set its NAV based on CTS-to-self frame 1618, thereby deferring channel access based on CTS-to-self frame 1618. The non-member STA may be a non-HE (pre-HE) or non-EHT (pre-EHT) STA, a non-r-TWT scheduled STA (an EHT STA that does not support r-TWT), or an r-TWT scheduled STA that is not a member of the TE r-TWT. Generally, a non-HE or non-EHT STA, regardless of implementation, is capable of interpreting a CTS-to-self frame. Thus, a non-member STA that is a non-HE or non-EHT STA of any type may be controlled according to this embodiment to defer its channel access based on CTS-to-self frame 1618.

In example 1600, non-member STA 1606 may set its NAV to a non-zero value based on receiving CTS-to-self frame 1618. As such, STA 1606 may defer channel access to transmit over the wireless medium based on CTS-to-self frame 1618. In an embodiment, CTS-to-self frame 1618 includes a duration field that indicates a period of channel access deferral. STA 1606 may set its NAV based on the period of channel access deferral included in the duration field of CTS-to-self frame 1618.

In an embodiment, a value of the duration field of CTS-to-self frame 1618 may be based on a value of a duration field of RTS frame 1614. In an embodiment, the value of the duration field of CTS-to-self frame 1618 may be equal to the value of the duration of field of RTS frame 1614, minus the time required to transmit CTS-to-self frame 1618, and minus the duration of a SIFS period. As such, CTS-to-self frame 1618 may not increase the NAV of some of the STA(s) receiving CTS-to-self frame 1618. For example, as shown in FIG. 16, STA 1608 may update its NAV based on receiving CTS-to-self frame 1618. As the duration field of CTS-to-self frame 1618 is set based on the duration field of RTS frame 1614, the updated NAV of STA 1608 may be equal to the previous NAV of STA 1608 set based on receiving RTS frame 1614. In other embodiments, the duration field of CTS-to-self frame 1618 may be set so as to result in a longer or shorter NAV at STA 1606 and/or STA 1608. The value of the duration field of CTS-to-self frame 1618 may also be set independent of the value of the duration field of RTS frame 1614.

In an embodiment, a member STA of the r-TWT may not set its NAV based on CTS-to-self frame 1618 (i.e., may ignore the NAV setting indicated in CTS-to-self frame 1618). As such, channel access of member STAs during the r-TWT SP is not affected by CTS-to-self frame 1618.

In an embodiment, an r-TWT scheduled STA (an EHT STA that supports r-TWT) may not set its NAV based on CTS-to-self frame 1618 (i.e., may ignore the NAV setting indicated in CTS-to-self frame 1618). As such, channel access of r-TWT scheduled STAs during the r-TWT SP is not affected by CTS-to-self frame 1618.

After transmitting CTS-to-self frame 1618, AP 1602 may proceed to transmit a trigger frame 1620 to member STA 1604. In response, STA 1604 may transmit a data frame 1622 containing latency-sensitive traffic to AP 1602, which may acknowledge data frame 1622 by transmitting a BA frame 1624 to STA 1604. As non-member STA 1606 has deferred its channel access based on CTS-to-self frame 1618, the transmission of trigger frame 1620 may not be disturbed by non-member STA 1606. Member STA 1604 may transmit its latency sensitive traffic earlier within r-TWT SP 1612 and may thus succeed in emptying its queue(s) of latency-sensitive traffic during r-TWT SP 1612.

Non-member STA 1606 may attempt re-transmission of RTS frame 1614 when its NAV returns to zero, possibly during r-TWT SP 1612. As in example 1500, as AP 1602 responds to RTS frame 1614 by transmitting CTS-to-self frame 1618, STA 1606 may not resort to a lower MCS and/or a larger CW for the re-transmission of the RTS frame. As such, transmission overhead as well as channel access delay by STA 1606 are not increased unnecessarily.

Figure 17:
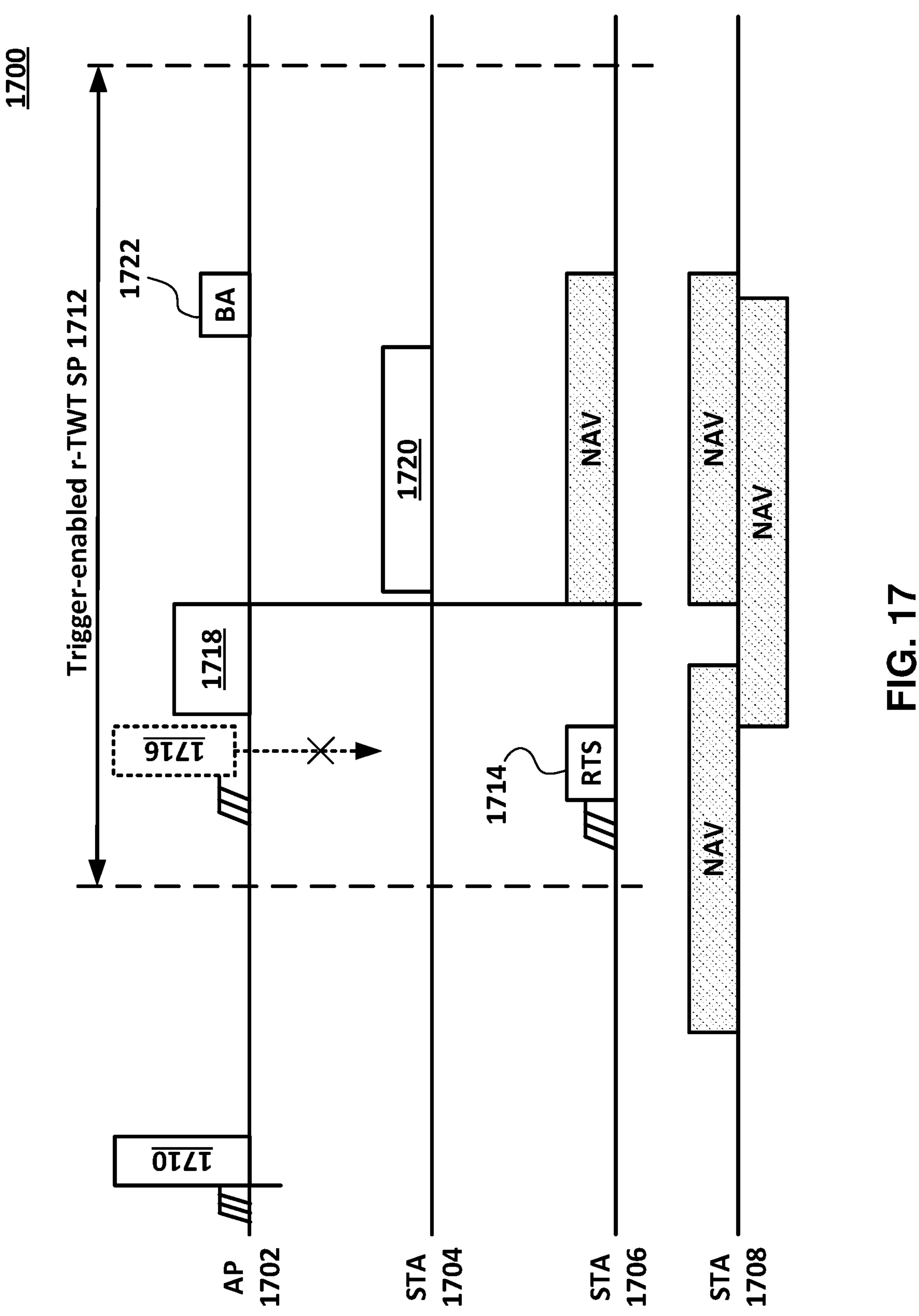
FIG. 17 illustrates an example TE r-TWT operation according to an embodiment.

FIG. 17 illustrates an example 1700 of TE r-TWT operation according to an embodiment. Example 1700 is provided for the purpose of illustration only and is not limiting of embodiments. As shown in FIG. 17, example 1700 includes an AP 1702 and STAs 1704, 1706, and 1708. In an example, AP 1702 may transmit a frame 1710 indicating a TE r-TWT SP 1712 of a TE r-TWT setup by AP 1702. Frame 1710 may be a beacon frame, for example.

In example 1700, STA 1704 may be a member r-TWT scheduled STA of the TE r-TWT, while STA 1706 may be a non-member of the TE r-TWT. STA 1706 may be a non-HE (pre-HE) or non-EHT (pre-EHT) STA, a non-r-TWT scheduled STA (an EHT STA that does not support r-TWT), or an r-TWT scheduled STA that is not a member of the TE r-TWT. STA 1708 may be a STA within communication range of AP 1702, STA 1704, and/or STA 1706. STA 1708 may or may not be a member of the TE r-TWT.

According to existing IEEE 802.11 rules, as a member of the TE r-TWT, STA 1704 may transmit during TE r-TWT SP 1712 in response to receiving a trigger frame from r-TWT scheduling AP 1702. STA 1704 however may not transmit using EDCA during TE r-TWT SP 1712. In contrast, as a non-member of the TE r-TWT, STA 1706 may access the channel using EDCA during TE r-TWT SP 1712.

In example 1700, STA 1706 may transmit an RTS frame 1714 to AP 1702 during r-TWT SP 1712. In an example, STA 1608 may have a non-zero NAV when STA 1708 receives RTS frame 1714. STA 1708 may set/update its NAV from an initial value to a value based on the Duration field of RTS frame 1714. The NAV of STA 1708 may increase based on receiving RTS frame 1714.

In an embodiment, AP 1702 may respond to RTS frame 1714 from STA 1706 by transmitting a trigger frame 1718. In an embodiment, AP 1702 may transmit trigger frame 1718 in response to RTS frame 1714 when the NAV indicates idle. In an embodiment, trigger frame 1718 may designate one or more member STAs of the r-TWT, such as member STA 1704. This allows AP 1702 to schedule member STAs earlier within r-TWT SP 1712.

In example 1700, trigger frame 1718 may designate member STA 1704. Trigger frame 1718 may include a User Info field for STA 1704. Trigger frame 1718 may include a User Info field with an AID12 subfield set to an AID of STA 1704. In an example, trigger frame 1718 may allocate a resource unit (RU) to STA 1704 during r-TWT SP 1712. STA 1704 may transmit a data frame 1720, via the RU, to AP 1702. Data frame 1720 may include a TB PPDU. Data frame 1720 may include a TID associated with the TE r-TWT. AP 1702 may acknowledge data frame 1720 by transmitting a BA frame 1722 to STA 1704.

STAs receiving trigger frame 1718 may or may not set/update their NAVs based on trigger frame 1718 as further described below.

In an embodiment, a non-member STA of the r-TWT may set its NAV based on trigger frame 1718, thereby deferring channel access based on trigger frame 1718. The non-member STA may be a non-HE (pre-HE) or non-EHT (pre-EHT) STA, a non-r-TWT scheduled STA (an EHT STA that does not support r-TWT), or an r-TWT scheduled STA that is not a member of the TE r-TWT. Generally, a non-HE or non-EHT STA, regardless of implementation, is capable of interpreting a trigger frame. Thus, a non-member STA that is a non-HE or non-EHT STA of any type may be controlled according to this embodiment to defer its channel access based on trigger frame 1718.

In example 1700, non-member STA 1706 may set its NAV to a non-zero value based on receiving trigger frame 1718. As such, STA 1706 may defer channel access to transmit over the wireless medium based on trigger frame 1718. In an embodiment, trigger frame 1718 includes a duration field that indicates a period of channel access deferral. STA 1706 may set its NAV based on the period of channel access deferral included in the duration field of trigger frame 1718.

In an embodiment, a member STA of the r-TWT may not set its NAV based on trigger frame 1718 (i.e., may ignore the NAV setting indicated in trigger frame 1718). As such, channel access of member STAs during the r-TWT SP is not affected by trigger frame 1718.

In an embodiment, an r-TWT scheduled STA (an EHT STA that supports r-TWT) may not set its NAV based on trigger frame 1718 (i.e., may ignore the NAV setting indicated in trigger frame 1718). As such, channel access of r-TWT scheduled STAs during the r-TWT SP is not affected by trigger frame 1718.

Non-member STA 1706 may attempt re-transmission of RTS frame 1714 when its NAV returns to zero, possibly during r-TWT SP 1712. As in example 1500, as AP 1702 responds to RTS frame 1714 by transmitting a trigger frame 1718, STA 1706 may not resort to a lower MCS and/or a larger CW for the re-transmission of the RTS frame. As such, transmission overhead as well as channel access delay by STA 1706 are not increased unnecessarily.

In a further embodiment (not illustrated by a figure), the AP may respond to an RTS frame from a non-member STA by transmitting a second frame configured to cause channel access deferral by the non-member STA. The second frame may be any one of a control frame, an action frame, a QoS null frame, or a QoS data frame. The second frame may have a frame format that indicates a period of channel access deferral by the non-member STA. The period of channel access deferral may be indicated in a duration field of the frame. In an embodiment, a non-member STA of the r-TWT (including the STA transmitting the RTS frame) may set its NAV based on the second frame. The non-member STA may be a non-HE (pre-HE) or non-EHT (pre-EHT) STA, a non-r-TWT scheduled STA (an EHT STA that does not support r-TWT), or an r-TWT scheduled STA that is not a member of the TE r-TWT. In an embodiment, a member STA of the r-TWT may not set its NAV based on the second frame (i.e., may ignore the NAV setting indicated in the second frame). In an embodiment, an r-TWT scheduled STA (an EHT STA that supports r-TWT) may not set its NAV based on the second frame (i.e., may ignore the NAV setting indicated in the second frame).

Figure 18:
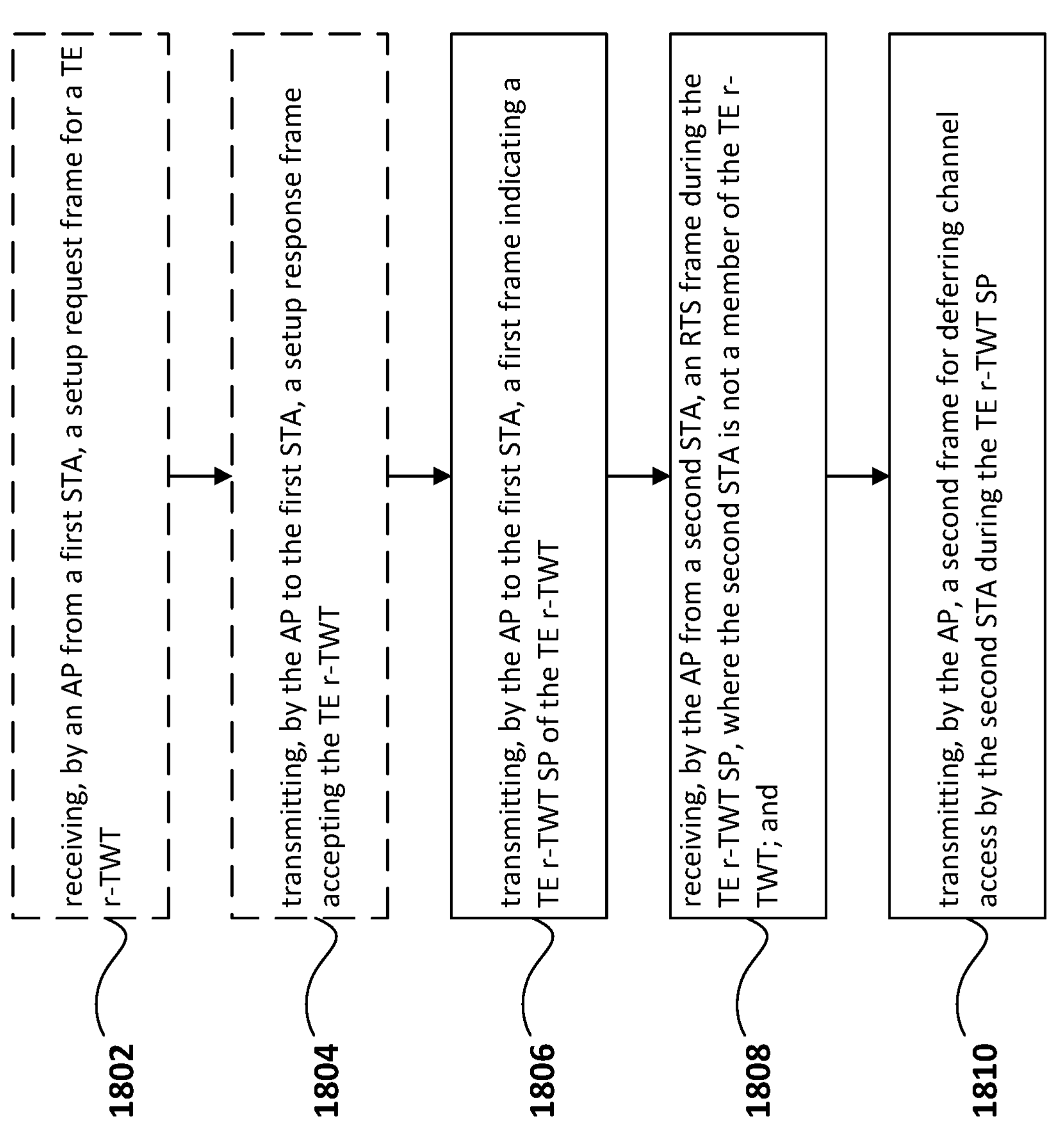
FIG. 18 illustrates an example process according to an embodiment.

FIG. 18 illustrates an example process 1800 according to an embodiment. Example process 1800 is provided for the purpose of illustration only and is not limiting of embodiments. Example process 1800 may be performed by an AP, such as AP 1502, AP 1602, or AP 1702, for example. As shown in FIG. 18, example process 1800 may include steps 1802, 1804, 1806, 1808, and 1810. Steps 1802 and 1804 may be optional.

Example process 1800 may begin in step 1802, which may include receiving, by the AP from a first STA, a setup request frame for a TE r-TWT. The setup request frame may be a TWT setup request frame. The setup request frame may include first parameters for the TE r-TWT as described above. The setup request frame may include a TID bitmap indicating TIDs corresponding to DL and/or UL traffic. The DL/UL traffic indicated in the TID bitmap may represent DL/UL traffic that may be transmitted during a service period of the TE r-TWT.

In step 1804, example process 1800 may include transmitting, by the AP to the first STA, a setup response frame. The setup response frame may accept the TE r-TWT requested in the setup request frame. The setup response frame may be a TWT setup response frame. The setup response frame may include second parameters for the TE r-TWT as described above. The second parameters may or may not be the same as the first parameters. The setup response frame may include a TID bitmap indicating TIDs corresponding to DL and/or UL traffic. The DL/UL traffic indicated in the TID bitmap may represent DL/UL traffic that may be transmitted during a service period of the TE r-TWT.

Upon successful setup of the TE r-TWT following steps 1802 and 1804, the first STA may be a member r-TWT scheduled STA of the TE r-TWT. The first STA may be allowed to transmit during a service period of the TE r-TWT in response to a trigger frame received from the AP during the service period. The first STA may not be permitted to access the channel using EDCA during the service period of the TE r-TWT.

Subsequently, in step 1806, example process 1800 may include transmitting, by the AP to the first STA, a first frame indicating a TE r-TWT SP of the TE r-TWT. The first frame may be a beacon frame, a broadcast probe response frame, a FILS discovery frame, or a TIM broadcast frame. The first frame may comprise a TWT element indicating scheduling information of the TE r-TWT. The scheduling information may indicate a start time and an end time of a TE r-TWT SP of the TE r-TWT.

Next, in step 1808, example process 1800 may include receiving, by the AP from a second STA, an RTS frame during the TE r-TWT SP. The second STA may be a non-member of the TE r-TWT. In an embodiment, the second STA may be a non-r-TWT scheduled STA. The non-r-TWT scheduled STA may be an EHT STA that sets a Broadcast TWT Support field to 0 in an HE Capabilities element that it transmits. The non-r-TWT scheduled STA may not receive a broadcast TWT element transmitted by an r-TWT scheduling AP. In another embodiment, the second STA may be a non-HE (pre-HE) or non-EHT (pre-EHT) STA. A non-HE or non-EHT STA may not support r-TWT operation. In a further embodiment, the second STA may be an r-TWT scheduled STA. The second STA may be an EHT STA. The second STA may support r-TWT operation but may not be a member of the setup r-TWT.

In another embodiment, the second STA may be a member of the TE r-TWT but may not be intended to be allocated an RU by the AP during the r-TWT SP or at the time that the RTS is received by the AP.

The second STA may use EDCA to transmit the RTS frame to the AP. A TA field of the RTS frame may be set to an address of the second STA. An RA field of the RTS frame may be set to an address of the AP. The second STA may transmit the RTS frame to protect from hidden STA(s) a data frame that the second STA intends to transmit after the RTS frame. The RTS frame may include a duration field. A value of the duration field of the RTS frame may be set to the sum of: (a) the transmission time of the RTS frame, (b) the transmission time of a CTS frame transmitted in response to the RTS frame, (c) the transmission time of the data frame, (d) the transmission time of an ACK frame transmitted in response to the data frame, and (e) the duration of three SIFS periods.

In step 1810, example process 1800 may include transmitting, by the AP, a second frame for deferring channel access by the second STA during the r-TWT SP. The deferring of channel access may defer channel access by the second STA to transmit the data frame that the second frame intends to transmit after the RTS frame. The deferring of channel access may cause the second STA to re-transmit the RTS frame received by the AP in step 1808. The deferring of channel access may defer channel access by the second STA until the end of the r-TWT SP or to a later time during the r-TWT SP.

In an embodiment, the second frame may include a CTS frame or a CTS-to-self frame. The second frame may include a duration field. The duration field of the second frame may indicate a period of channel access deferral by the second STA. The duration field of the second frame may be set based on the RTS frame. A value of the duration field of the second frame may be set based on a value of a duration field of the RTS frame. In an embodiment, the value of the duration field of the second frame is equal to the value of the duration of field of the RTS frame, minus the time required to transmit the CTS frame, and minus the duration of a SIFS period.

In an embodiment, where the second frame includes a CTS frame, an RA field of the CTS frame may be set based on a TA field of the RTS frame with an Individual/Group bit of the TA field set to 1. In an embodiment, where the second frame includes a CTS frame, an RA field of the CTS frame may be set based on a TA field of the RTS frame with bit 0 of the TA field set to 1. In an embodiment, where the second frame includes a CTS frame, an RA field of the CTS frame may be based on a MAC address of the second STA with bit 0 of the MAC address of the second STA set to 1.

In an embodiment, where the second frame includes a CTS-to-self frame, an RA field of the CTS-to-self frame may be set based on a MAC address of the AP.

In an embodiment, the second frame may be a trigger frame. The trigger frame may designate the first STA. The trigger frame may allocate a resource unit (RU) to the first STA during the r-TWT SP. In an embodiment, the trigger frame may include a User Info field for the first STA. The User Info field may include an AID12 subfield. The AID12 subfield of the User Info field may be set to an AID of the first STA.

In an embodiment, the trigger frame may not designate the second STA. In an embodiment, the trigger frame may not designate the second STA, despite the second STA being a member of the r-TWT.

In an embodiment, example process 1800 may further include receiving, by the AP from the first STA, a data frame via the RU allocated to the first STA by the trigger frame. The data frame may comprise a TID associated with the TE r-TWT. The data frame may include a TB PPDU.

In an embodiment, the second frame may be a control frame, an action frame, a QoS null frame, or a QoS data frame. The second frame may indicate a period of channel access deferral by the second STA. The period of channel access deferral by the second STA may be indicated in a duration field of the second frame. The duration field of the second frame may be set based on the RTS frame transmitted by the second STA. A value of the duration field of the second frame may be set based on a value of a duration field of the RTS frame. In an embodiment, the value of the duration field of the second frame is equal to the value of the duration of field of the RTS frame, minus the time required to transmit the CTS frame, and minus the duration of a SIFS period.

In an embodiment, the AP may consider the NAV in determining whether to transmit the second frame. In an embodiment, the AP may not consider the NAV when the NAV was set by a frame originating from the second STA. In an embodiment, the AP may transmit the second frame on a condition that the NAV indicates idle. In an embodiment, the NAV indicates idle when the NAV count of the AP is 0 or when the NAV count of the AP is non-zero but the nonbandwidth signaling TA obtained from the TA field of the RTS frame matches a saved TXOP holder address. In an embodiment, the NAV indicates idle when both the NAV and RID (response indication deferral) counters are 0 or when either the NAV or RID counter is non-zero but the TA field of the RTS frame matches the saved TXOP holder address.

Figure 19:
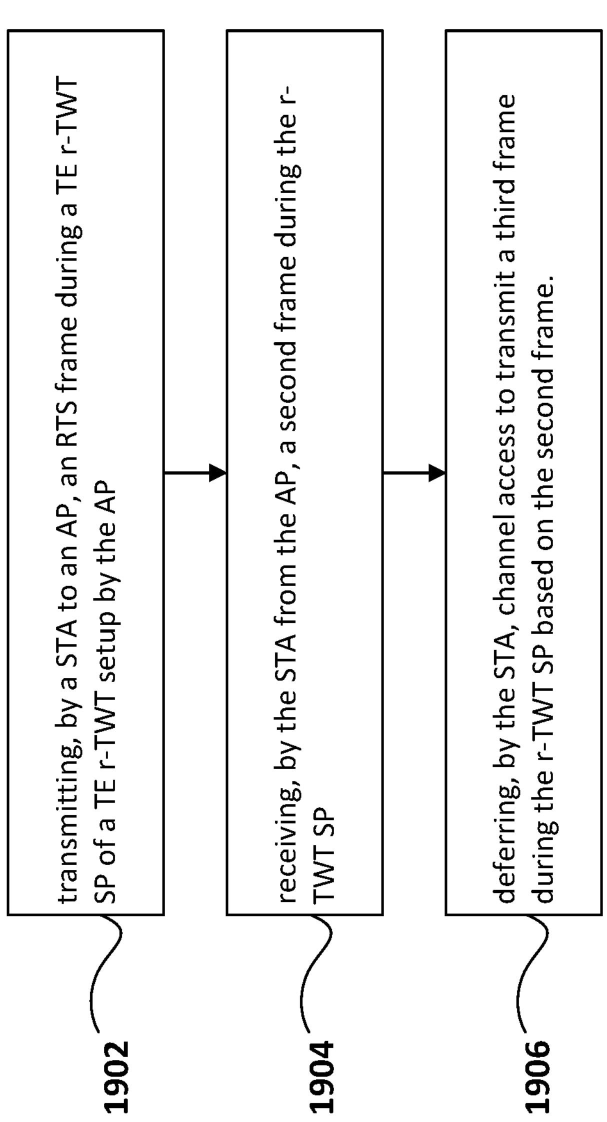
FIG. 19 illustrates an example process according to an embodiment.

FIG. 19 illustrates an example process 1900 according to an embodiment. Example process 1900 is provided for the purpose of illustration only and is not limiting of embodiments. Example process 1900 may be performed by a STA, such as STA 1506, STA 1606, or STA 1706, for example. As shown in FIG. 19, example process 1900 may include steps 1902, 1904, and 1906.

Example process 1900 may begin in step 1902, which may include transmitting, by the STA to an AP, an RTS frame during a TE r-TWT SP of a TE r-TWT setup by the AP. The STA may be associated with the AP and may form part of the same BSS. In an embodiment, the TE r-TWT may be setup by the AP for one or more STAs (member STAs).

The STA may be a non-member of the TE r-TWT. In an embodiment, the STA may be a non-r-TWT scheduled STA. The non-r-TWT scheduled STA may be an EHT STA that sets a Broadcast TWT Support field to 0 in an HE Capabilities element that it transmits. The non-r-TWT scheduled STA may not receive a broadcast TWT element transmitted by an r-TWT scheduling AP. In another embodiment, the STA may be a non-HE (pre-HE) or non-EHT (pre-EHT) STA. A non-HE or non-EHT STA may not support r-TWT operation. In a further embodiment, the STA may be an r-TWT scheduled STA. The STA may be an EHT STA. The STA may support r-TWT operation but may not be a member of the setup r-TWT.

In another embodiment, the STA may be a member of the TE r-TWT but may not be intended to be allocated an RU by the AP during the r-TWT SP or at the time that the STA transmits the RTS to the AP.

The STA may use EDCA to transmit the RTS frame to the AP. A TA field of the RTS frame may be set to an address of the STA. An RA field of the RTS frame may be set to an address of the AP. The STA may transmit the RTS frame to protect from hidden STA(s) a data frame that the STA intends to transmit after the RTS frame. The RTS frame may include a duration field. A value of the duration field of the RTS frame may be set to the sum of: (a) the transmission time of the RTS frame, (b) the transmission time of a CTS frame transmitted in response to the RTS frame, (c) the transmission time of the data frame, (d) the transmission time of an ACK frame transmitted in response to the data frame, and (e) the duration of three Short Interframe Spacing (SIFS) periods.

Next, in step 1904, example process 1900 may include receiving, by the STA from the AP, a second frame during the r-TWT SP. The second frame may be transmitted by the AP in response to the RTS frame transmitted by the STA in step 1902.

In an embodiment, the second frame may include a CTS frame or a CTS-to-self frame. The second frame may include a duration field. The duration field of the second frame may indicate a period of channel access deferral by the STA. The duration field of the second frame may be set based on the RTS frame transmitted by the STA in step 1902. A value of the duration field of the second frame may be set based on a value of a duration field of the RTS frame. In an embodiment, the value of the duration field of the second frame is equal to the value of the duration of field of the RTS frame, minus the time required to transmit a CTS frame in response to the RTS frame, and minus the duration of a SIFS period.

In an embodiment, where the second frame includes a CTS frame, an RA field of the CTS frame may be set based on a TA field of the RTS frame with an Individual/Group bit of the TA field set to 1. In an embodiment, where the second frame includes a CTS frame, an RA field of the CTS frame may be set based on a TA field of the RTS frame with bit 0 of the TA field set to 1. In an embodiment, where the second frame includes a CTS frame, an RA field of the CTS frame may be based on a MAC address of the second STA with bit 0 of the MAC address of the second STA set to 1.

In an embodiment, where the second frame includes a CTS-to-self frame, an RA field of the CTS-to-self frame may be set based on a MAC address of the AP.

In an embodiment, the second frame may be a trigger frame. The trigger frame may designate a first STA other than the STA. The trigger frame may allocate an RU to the first STA during the r-TWT SP. In an embodiment, the trigger frame may include a User Info field for the first STA. The User Info field may include an AID12 subfield. The AID12 subfield of the User Info field may be set to an AID of the first STA.

In an embodiment, the trigger frame may not designate the STA. In an embodiment, the trigger frame may not designate the STA, despite the STA being a member of the r-TWT.

In an embodiment, the second frame may be a control frame, an action frame, a QoS null frame, or a QoS data frame. The second frame may indicate a period of channel access deferral by the STA. The period of channel access deferral by the STA may be indicated in a duration field of the second frame. The duration field of the second frame may be set based on the RTS frame transmitted by the STA. A value of the duration field of the second frame may be set based on a value of a duration field of the RTS frame. In an embodiment, the value of the duration field of the second frame is equal to the value of the duration of field of the RTS frame, minus the time required to transmit a CTS frame in response to the RTS frame, and minus the duration of a SIFS period.

In step 1906, example process 1900 may include deferring, by the STA, channel access to transmit a third frame during the r-TWT SP based on the second frame. In an embodiment, the third frame may be the data frame that the STA intended to transmit by transmitting the RTS frame in step 1902. In another embodiment, the third frame may be (a retransmission of) the RTS frame, i.e., the STA defers channel access based on the second frame, before re-transmitting the RTS frame and the data frame.

The deferring of channel access may defer channel access by the STA until the end of the r-TWT SP or to a later time during the r-TWT SP. In an embodiment, the deferring of channel access by the STA may be based on the value of a duration field of the second frame. In an embodiment, the STA may update its NAV based on the value of the duration field of the second frame. The STA may update its NAV when the value of the duration field of the second frame is greater than a current NAV value of the STA.

In an embodiment, where the second frame includes a CTS frame, the STA defers channel access based on the second frame when an RA field of the CTS frame is set to a TA field of the RTS frame with an Individual/Group bit of the TA field set to 1. In an embodiment, where the second frame includes a CTS frame, the STA defers channel access based on the second frame when an RA field of the CTS frame is set to a TA field of the RTS frame with bit 0 of the TA field set to 1. In an embodiment, where the second frame includes a CTS frame, the STA defers channel access based on the second frame when an RA field of the CTS frame is set to a MAC address of the second STA with bit 0 of the MAC address of the second STA set to 1.

In an embodiment, where the second frame includes a CTS-to-self frame, the STA defers channel access based on the second frame when an RA field of the CTS-to-self frame is set to a MAC address of the AP.

In an embodiment, where the second frame is a trigger frame, the STA defers channel access based on the second frame when the trigger frame does not designate the STA. The trigger frame may not designate the STA, despite the STA being a member of the r-TWT.

According to embodiments, unless modified otherwise by embodiments of the present disclosure as discussed herein, a TWT scheduling AP and a TWT scheduled STA may follow rules as defined in the IEEE 802.11 standard draft "IEEE P802.11-REVme™/D1.3, June 2022." For example, among other sections, a TWT scheduling AP may follow the rules defined in section 26.8.3.2 (Rules for TWT scheduling AP) of the IEEE 802.11 standard draft "IEEE P802.11-REVme™/D1.3, June 2022.". Among other sections, a TWT scheduled STA may follow the rules defined in section 26.8.3.3 (Rules for TWT scheduled STA) and 26.8.5 (Power save operation during TWT SPs) of the IEEE 802.11 standard draft "IEEE P802.11-REVme™/D1.3, June 2022."

According to the rules defined in section 26.8.3.2:

A TWT scheduling AP that receives a PS-Poll or a U-APSD trigger frame or any other indication from a TWT scheduled STA in PS mode, during or before a specific announced TWT SP but after the end of the most recent TWT SP preceding the specific TWT SP (if any), that the TWT scheduled STA is in the awake state during the TWT SP shall follow the rules defined in 11.2.3.6 (AP operation), except that the AP should deliver to the TWT scheduled STA as many buffered BUs as are available at the AP, provided that the BU delivery does not exceed the duration of the TWT SP, the TWT scheduled STA has indicated that it is in the awake state for that TWT SP, and the TWT scheduled STA has not entered the doze state (see 26.8.4.3 (TWT Information frame exchange for broadcast TWT) and 26.8.5 (Power save operation during TWT SPs)).

A TWT scheduling AP that sends frames to a TWT scheduled STA that is in PS mode during an unannounced TWT SP shall follow the rules defined in 11.2.3.6 (AP operation), except that the AP should deliver to the TWT scheduled STA as many buffered BUs as available at the AP, provided that the BU delivery does not exceed the duration of the TWT SP and the TWT scheduled STA has not entered the doze state (see 26.8.4.3 (TWT Information frame exchange for broadcast TWT) and 26.8.5 (Power save operation during TWT SPs)). NOTE 7—The TWT scheduling AP can deliver the buffered BUs in A-MPDUs sent under a BlockAck agreement if the TWT is an announced TWT and the TWT scheduled STA is awake for that TWT SP or if the TWT is an unannounced TWT (at the start of which the TWT scheduled STA is assumed to already be awake). The buffered BUs can be delivered in multiple PPDUs transmitted within the TWT SP. The TWT scheduling AP can exceed the duration of the TWT SP if the TWT scheduled STA is in active mode.

According to the rules defined in section 26.8.3.3:

A TWT scheduled STA should not transmit frames to the TWT scheduling AP outside of broadcast TWT SPs and should not transmit frames that are not contained within HE TB PPDUs to the TWT scheduling AP within trigger-enabled broadcast TWT SPs, except that the STA can transmit frames within negotiated individual TWT SPs as defined in 26.8.2 (Individual TWT agreements). NOTE 1—The TWT scheduled STA decides which frames to transmit within or outside a TWT SP; and while it is recommended that the TWT scheduled STA not transmit using EDCA within or outside TWT SPs, the TWT scheduled STA might still do so. If the STA decides to transmit, then the STA might contend for accessing the medium as defined in 10.23.2 (HCF contention-based channel access (EDCA)) and in 26.2.7 (EDCA operation using MU EDCA parameters).

According to the rules defined in section 26.8.5:

A TWT requesting STA or a TWT scheduled STA that is not in PS mode and that transmits a frame with the Power Management subfield set to 1 during a TWT SP shall remain in the awake state until the AdjustedMinimumTWTWakeDuration time has elapsed from the TWT SP start time or until a TWT SP termination event is detected, whichever occurs first for that particular TWT SP.

A TWT requesting STA or a TWT scheduled STA in PS mode that is in the awake state for a TWT SP may transition to the doze state after AdjustedMinimumTWTWakeDuration time has elapsed from the TWT SP start time even if it has previously transmitted a PS-Poll frame or U-APSD trigger frame and has not yet received the expected frames from the AP in response. For a trigger-enabled TWT SP, if the AdjustedMinimumTWTWakeDuration time has elapsed from the scheduled TWT SP start time and no Trigger frames are received by the STA, the HE STA may enter doze state if no other condition requires the STA to remain awake. When a TWT SP termination event is detected within a TWT SP by a STA in PS mode that is participating in the TWT SP, the STA may transition to the doze state without waiting for the expiration of the AdjustedMinimumTWTWakeDuration time as described in 10.47.1 (TWT overview), even if it has previously transmitted a PS-Poll frame or U-APSD trigger frame and has not yet received the expected frames from the AP in response.

A TWT requesting STA or a TWT scheduled STA shall classify any of the following events as a TWT SP termination event:

a) The transmission by the TWT requesting STA of an acknowledgment in response to an individually addressed QoS Data or QoS Null frame sent by the TWT responding STA that had the EOSP subfield equal to 1.
b) The transmission by the TWT scheduled STA of an acknowledgment in response to an individually addressed QoS Data or QoS Null frame sent by the TWT scheduling AP that had the EOSP subfield equal to 1.
c) The transmission by the TWT requesting STA of an acknowledgment in response to an individually addressed frame that is neither a QoS Data frame nor a QoS Null frame, but that was sent by the TWT responding STA with the More Data field equal to 0.
d) The transmission by the TWT scheduled STA of an acknowledgment in response to an individually addressed frame that is neither a QoS Data frame nor a QoS Null frame, but that was sent by the TWT scheduling AP with the More Data field equal to 0.
e) The reception of an individually addressed or broadcast QoS Data or QoS Null frame sent by the TWT responding STA or TWT scheduling AP that does not solicit an immediate response and had the EOSP subfield equal to 1.
f) The reception of an individually addressed frame that is neither a QoS Data frame nor a QoS Null frame, but that was sent by the TWT responding STA or TWT scheduling AP, does not solicit an immediate response, and had the More Data field equal to 0.
g) The reception of a Trigger frame sent by the TWT responding STA or TWT scheduling AP that has the More TF field equal to 0 and is not addressed to the TWT requesting STA or TWT scheduled STA, provided that the TWT requesting STA or TWT scheduled STA either is awake for an announced trigger-enabled TWT SP but did not transmit an indication that it is in the awake state to the TWT responding STA or TWT scheduling AP or is awake for an unannounced trigger-enabled TWT SP.
h) The transmission or reception by the TWT requesting STA of the acknowledgment for a TWT Information frame that satisfies specific conditions in 26.8.4.2 (TWT Information frame exchange for individual TWT) and 26.8.4.4 (TWT Information frame exchange for flexible wake time).
i) The transmission or reception by the TWT scheduled STA of the acknowledgment for a TWT Information frame that satisfies specific conditions in 26.8.4.3 (TWT Information frame exchange for broadcast TWT) and 26.8.4.4 (TWT Information frame exchange for flexible wake time).

What is claimed is:

1. An access point (AP) comprising:
one or more processors; and
memory storing instructions that, when executed by the one or more processors, cause the AP to:
transmit, to a first station (STA), a first frame indicating a trigger-enabled (TE) restricted target wake time (r-TWT) service period (SP) of a TE r-TWT set up between the AP and the first STA;
receive, from a second STA, a Request to Send (RTS) frame during the TE r-TWT SP; and
transmit, in response to the RTS frame and during the TE r-TWT SP, a second frame for deferring channel access by the second STA during the TE r-TWT SP.

2. The AP of claim 1, wherein the second frame includes a Clear to Send (CTS) frame or a CTS-to-self frame.

3. The AP of claim 2, wherein the second frame includes a duration field that indicates a period of channel access deferral by the second STA.

4. The AP of claim 2, wherein the second frame includes a CTS-to-self frame, and wherein a receiver address (RA) field of the CTS-to-self frame is set based on a Medium Access Control (MAC) address of the AP.

5. The AP of claim 1, wherein the second frame is a trigger frame that allocates a resource unit (RU) to the first STA during the TE r-TWT SP.

6. The AP of claim 5, wherein the instructions, when executed by the one or more processors, further cause the AP to receive, from the first STA, a data frame via the RU.

7. The AP of claim 1, wherein the second STA is a non-r-TWT scheduled STA or an r-TWT scheduled STA.

8. The AP of claim 1, wherein the second STA is not a member of the TE r-TWT.

9. A station (STA) comprising:
one or more processors; and
memory storing instructions that, when executed by the one or more processors, cause the STA to:
transmit, to an access point (AP), a Request to Send (RTS) frame during a trigger-enabled (TE) restricted target wake time (r-TWT) service period (SP) of a TE r-TWT set up by the AP;
receive, from the AP and in response to the RTS frame, a second frame during the TE r-TWT SP; and
defer channel access to transmit a third frame during the TE r-TWT SP based on the second frame.

10. The STA of claim 9, wherein the second frame includes a Clear to Send (CTS) frame or a CTS-to-self frame.

11. The STA of claim 10, wherein the second frame includes a duration field that indicates a period of channel access deferral by the STA.

12. The STA of claim 10, wherein the second frame includes a CTS-to-self frame, and wherein a receiver address (RA) field of the CTS-to-self frame is set based on a Medium Access Control (MAC) address of the AP.

13. The STA of claim 9, wherein the second frame is a trigger frame.

14. The STA of claim 13, wherein the trigger frame does not designate the STA.

15. The STA of claim 13, wherein the trigger frame allocates a resource unit (RU) to a second STA during the TE r-TWT SP.

16. The STA of claim 9, wherein the STA is a non-r-TWT scheduled STA or an r-TWT scheduled STA.

17. The STA of claim 9, wherein the STA is not a member of the TE r-TWT.

18. The STA of claim 9, wherein the third frame is a retransmission of the RTS frame.

19. A non-transitory computer-readable medium comprising instructions that, when executed by one or more processors of an access point (AP), cause the AP to:
transmit, to a first station (STA), a first frame indicating a trigger-enabled (TE) restricted target wake time (r-TWT) service period (SP) of a TE r-TWT set up between the AP and the first STA;
receive, from a second STA, a Request to Send (RTS) frame during the TE r-TWT SP; and
transmit, in response to the RTS frame and during the TE r-TWT SP, a second frame for deferring channel access by the second STA during the TE r-TWT SP.

20. The non-transitory computer-readable medium of claim 19, wherein the second STA is not a member of the TE r-TWT.

* * * * *